(12) United States Patent
Timofeev et al.

(10) Patent No.: US 11,909,113 B2
(45) Date of Patent: Feb. 20, 2024

(54) SQUINTED FEEDS IN LENS-BASED ARRAY ANTENNAS

(71) Applicant: Matsing, Inc., Irvine, CA (US)

(72) Inventors: Igor Timofeev, Dallas, TX (US); Serguei Matitsine, Dallas, TX (US); Leonid Matytsine, Irvine, CA (US)

(73) Assignee: Matsing, Inc., Irvine, CA (US)

( * ) Notice: Subject to any disclaimer, the term of this patent is extended or adjusted under 35 U.S.C. 154(b) by 0 days.

(21) Appl. No.: 18/101,022

(22) Filed: Jan. 24, 2023

(65) Prior Publication Data

US 2023/0163479 A1 May 25, 2023

Related U.S. Application Data

(63) Continuation-in-part of application No. 17/832,553, filed on Jun. 3, 2022, which is a continuation-in-part
(Continued)

(51) Int. Cl.
*H01Q 15/02* (2006.01)
*H01Q 1/24* (2006.01)
(Continued)

(52) U.S. Cl.
CPC .............. *H01Q 15/02* (2013.01); *H01Q 1/24* (2013.01); *H01Q 1/36* (2013.01); *H01Q 3/14* (2013.01);
(Continued)

(58) Field of Classification Search
CPC ............ H01Q 15/02; H01Q 1/24; H01Q 1/36; H01Q 3/14; H01Q 3/18; H01Q 3/36;
(Continued)

(56) References Cited

U.S. PATENT DOCUMENTS 3,755,818 A   8/1973 Greenspan
3,765,024 A   10/1973 Chiron et al.
(Continued)

FOREIGN PATENT DOCUMENTS

| CN | 102176545 A | 9/2011 |
| KR | 1020090040887 | 9/2011 |
| WO | WO-2008015757 | 2/2008 |

OTHER PUBLICATIONS

US Electrodynamics Inc., Teleport Catalog, Apr. 2018, 2 pages.

*Primary Examiner* — Hai V Tran
(74) *Attorney, Agent, or Firm* — Fish IP Law, LLP; Robert D. Fish

(57) ABSTRACT

A radio frequency antenna array uses lenses and RF elements, to provide ground-based coverage for cellular communication. The antenna array can include two spherical lenses, where each spherical lens has at least two associated RF elements. Each of the RF elements associated with a given lens produces an output beam with an output area. Each lens is positioned with the other lenses in a staggered arrangement. The antenna includes a control mechanism configured to enable a user to move the RF elements along their respective tracks, and automatically phase compensate the output beams produced by the RF elements based on the relative distance between the RF elements.

13 Claims, 23 Drawing Sheets

Related U.S. Application Data of application No. 17/499,655, filed on Oct. 12, 2021, now Pat. No. 11,509,057, which is a continuation-in-part of application No. 17/404,518, filed on Aug. 17, 2021, now Pat. No. 11,509,056, which is a continuation-in-part of application No. 17/334,507, filed on May 28, 2021, now Pat. No. 11,394,124, which is a continuation-in-part of application No. 17/115,718, filed on Dec. 8, 2020, now Pat. No. 11,431,099, which is a continuation-in-part of application No. 17/086,141, filed on Oct. 30, 2020, now Pat. No. 11,050,157, which is a continuation-in-part of application No. 16/740,376, filed on Jan. 10, 2020, now Pat. No. 10,931,021, which is a continuation of application No. 16/422,628, filed on May 24, 2019, now Pat. No. 10,559,886, which is a continuation-in-part of application No. 16/208,443, filed on Dec. 3, 2018, now Pat. No. 10,326,208, which is a continuation of application No. 15/698,850, filed on Sep. 8, 2017, now Pat. No. 10,224,636, which is a continuation of application No. 15/289,531, filed on Oct. 10, 2016, now Pat. No. 10,224,635, which is a continuation of application No. 14/958,607, filed on Dec. 3, 2015, now Pat. No. 9,728,860.

(60) Provisional application No. 62/201,523, filed on Aug. 5, 2015.

(51) Int. Cl.

| | | |
|---|---|---|
| *H01Q 1/36* | (2006.01) | |
| *H01Q 3/14* | (2006.01) | |
| *H01Q 3/18* | (2006.01) | |
| *H01Q 3/36* | (2006.01) | |
| *H01Q 3/38* | (2006.01) | |
| *H01Q 5/20* | (2015.01) | |
| *H01Q 21/22* | (2006.01) | |
| *H01Q 19/06* | (2006.01) | |
| *H01Q 21/00* | (2006.01) | |
| *H01Q 15/18* | (2006.01) | |
| *H04B 7/155* | (2006.01) | |

(52) U.S. Cl.
CPC ............... *H01Q 3/18* (2013.01); *H01Q 3/36* (2013.01); *H01Q 3/38* (2013.01); *H01Q 5/20* (2015.01); *H01Q 19/062* (2013.01); *H01Q 21/00* (2013.01); *H01Q 21/0031* (2013.01); *H01Q 21/22* (2013.01); *H01Q 15/18* (2013.01); *H01Q 19/06* (2013.01); *H04B 7/155* (2013.01)

(58) Field of Classification Search
CPC .......... H01Q 3/38; H01Q 5/20; H01Q 19/062; H01Q 21/003; H01Q 21/22; H01Q 15/18; H01Q 19/06; H04B 7/155
USPC ....................................................... 343/754
See application file for complete search history.

(56) References Cited

U.S. PATENT DOCUMENTS

| | | | | |
|---|---|---|---|---|
| 5,703,603 | A | * | 12/1997 | Korzhenkov ............ H01Q 5/45 343/753 |
| 5,821,908 | A | | 10/1998 | Sreenivas |
| 5,831,582 | A | | 11/1998 | Muhlhauser et al. |
| 6,208,288 | B1 | | 3/2001 | Shoucri et al. |
| 6,262,688 | B1 | * | 7/2001 | Kasahara ............. H01Q 19/062 343/765 |
| 6,292,134 | B1 | | 9/2001 | Bondyopadhyay |
| 6,329,956 | B1 | * | 12/2001 | Tateishi ................... H01Q 3/08 343/753 |
| 6,356,247 | B1 | * | 3/2002 | Hirtzlin .............. H04B 7/18571 343/753 |
| 6,606,077 | B2 | | 8/2003 | Ebling et al. |
| 6,950,073 | B2 | | 9/2005 | Clymer et al. |
| 7,042,420 | B2 | * | 5/2006 | Ebling ................... H01Q 19/17 343/911 L |
| 7,151,508 | B2 | | 12/2006 | Schaffner et al. |
| 7,212,169 | B2 | | 5/2007 | Ogawa et al. |
| 7,605,768 | B2 | | 10/2009 | Ebling et al. |
| 7,667,665 | B1 | | 2/2010 | Colburn et al. |
| 8,248,317 | B1 | | 8/2012 | Meagher et al. |
| 8,311,582 | B2 | | 11/2012 | Trigui et al. |
| 2003/0043086 | A1 | | 3/2003 | Schaffner et al. |
| 2003/0090416 | A1 | | 5/2003 | Howell et al. |
| 2006/0017637 | A1 | | 1/2006 | Howell et al. |
| 2010/0001900 | A1 | | 1/2010 | Imai et al. |
| 2010/0289698 | A1 | | 11/2010 | Ahlberg |
| 2011/0231061 | A1 | | 9/2011 | Reeve et al. |
| 2014/0227966 | A1 | | 8/2014 | Artemenko et al. |
| 2015/0070230 | A1 | | 3/2015 | Bradley et al. |
| 2015/0091767 | A1 | | 4/2015 | Matitsine et al. |
| 2017/0040683 | A1 | | 2/2017 | Matitsine et al. |
| 2017/0070863 | A1 | | 3/2017 | Lee et al. |

\* cited by examiner

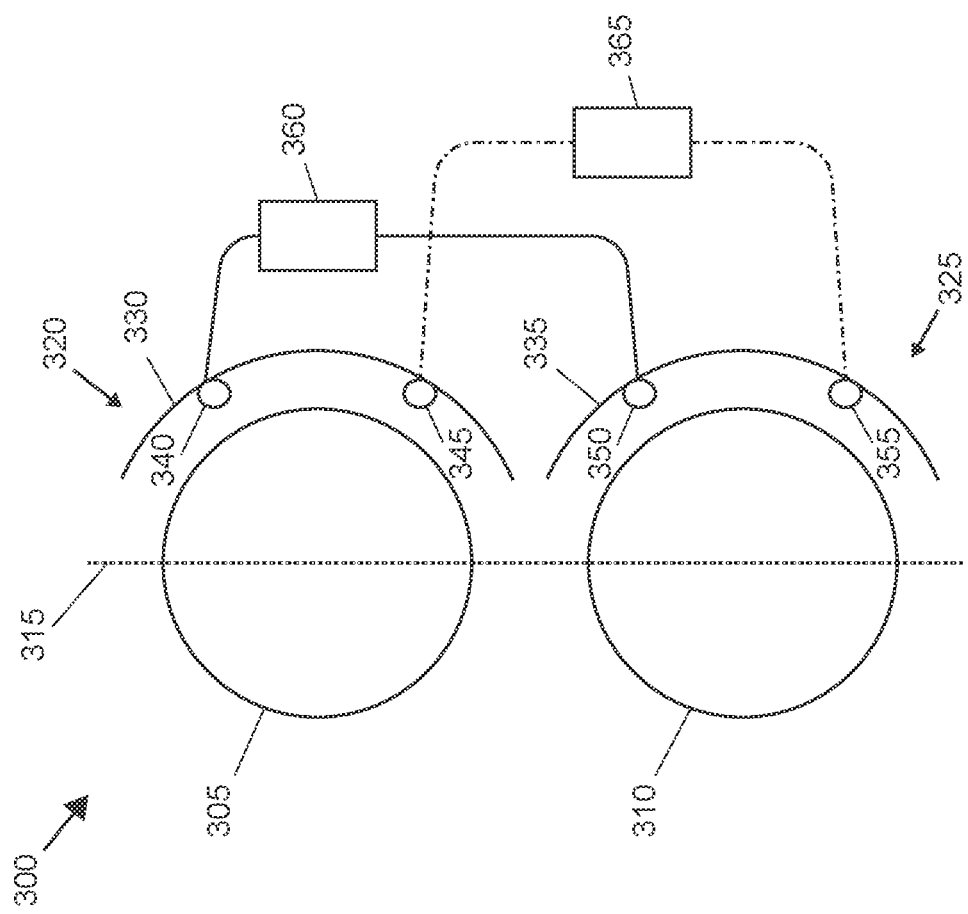

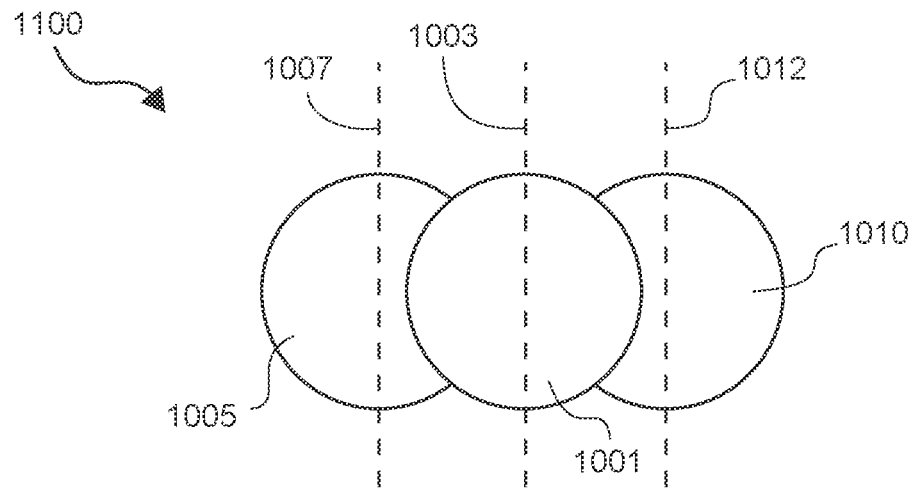
FIG. 11A
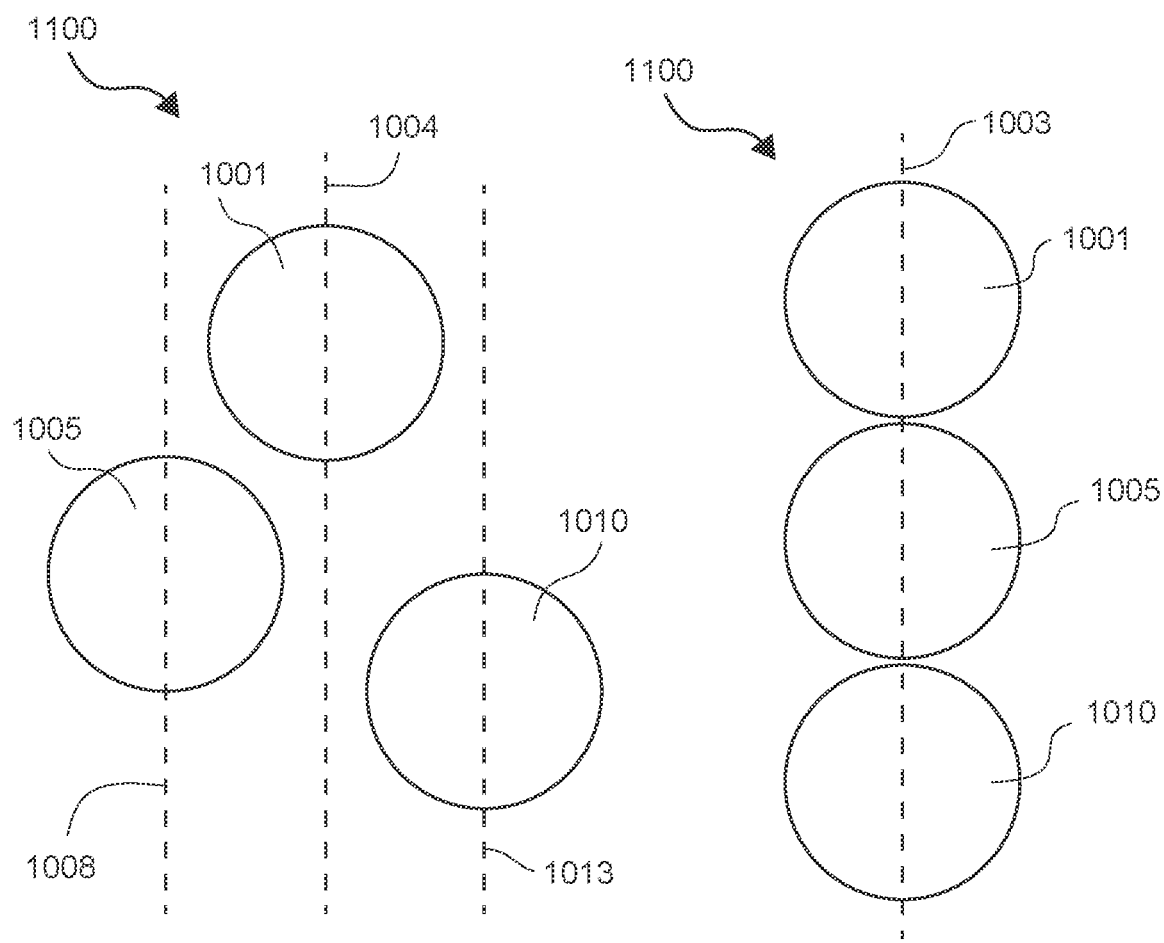
FIG. 11B
FIG. 11C

SQUINTED FEEDS IN LENS-BASED ARRAY ANTENNAS

This application is a continuation-in-part of co-pending U.S. Non-Provisional application Ser. No. 17/832,553, filed Jun. 3, 2022, which is a continuation-in-part of issued U.S. Non-Provisional application Ser. No. 17/499,655, filed Oct. 12, 2021, which is a continuation-in-part of issued U.S. patent Ser. No. 11/509,056, filed Aug. 17, 2021, which is a continuation-in-part of issued U.S. patent Ser. No. 11/394,124, filed May 28, 2021, which is a continuation-in-part of issued U.S. patent Ser. No. 11/431,099, filed Dec. 8, 2020, which is a continuation-in-part of U.S. patent Ser. No. 11/050,157 filed Oct. 30, 2020, which is a continuation-in-part of U.S. patent Ser. No. 10/931,021 filed Jan. 10, 2020, which is a continuation of U.S. patent Ser. No. 10/559,886, filed May 24, 2019, which is a continuation-in-part of U.S. patent Ser. No. 10/326,208, filed Dec. 3, 2018, which is a continuation of U.S. patent Ser. No. 10/224,636, filed Sep. 8, 2017, which is a continuation of U.S. patent Ser. No. 10/224,635, filed Oct. 10, 2016, which is a continuation of U.S. Pat. No. 9,728,860, filed Dec. 3, 2015, which claims the benefit of U.S. Provisional Application No. 62/201,523 filed Aug. 5, 2015. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is radio frequency antenna technology.

BACKGROUND

The following description includes information that may be useful in understanding the present invention. It is not an admission that any of the information provided herein is prior art or relevant to the presently claimed invention, or that any publication specifically or implicitly referenced is prior art.

Lens based antennas using light weight dielectric material have seen a growing market for several applications including base station antennas, stadium antennas, special event antennas, and satellite tracking antennas. Multiple feeds can be placed behind a single lens to create a multiple beam antenna. Spherical lenses allow feeds to be placed and moved around the surface of the lens without compromising performance due to scan angle or beam tilt angle. This is a major advantage for lens antenna systems compared to flat plate approaches found in most massive MIMO (multiple input multiple output) products.

In certain applications where a large beam count per lens is required, such as stadium coverage, it is desirable to have as many beams as possible. The trade-off is between the physical ability to place feeds and the beam count. A key performance metric is the beam cross over level. This is defined as the radiation pattern power level relative to beam peak where, at a given look angle, two adjacent beams are at the same power level. The beam cross over is related to system performance, typically a level of greater than 10 dB is desirable to maintain sufficient SINR (signal to interference plus noise ratio) at any point within the desired coverage area.

In many cases, capacity in a wireless network can be increased by: 1) adding to the number of nodes in the network, 2) providing increased frequency coverage (e.g. wider bandwidths), or 3) improving the air interface method to increase data throughput. However, the second and third approaches generally rely on advances outside the network operator's control. For example, the acquisition and utilization of wider bandwidths depends on local governments granting new licenses for a given section of the RF spectrum. Further, improved air interface methods are typically developed outside the Research and Development processes of the network operators. As such, network operators can choose to split cells—this cell splitting has been a known step in increasing network capacity since cellular networks were invented in the 1970s. However, new cells historically meant the necessity of a new site along with the associated complexity and costs. Another known alternative process is to increase the number of sectors at a given cell site. This alternative process could be accomplished by adding additional antennas at a given site, or by using common aperture multi-beam antennas.

However, a drawback of multiple beam antennas is poor beam to beam isolation. Beam isolation is calculated by the amount of impinging signals produced by beams adjacent to that beam assigned to a receiver. From a transmit view, beam isolation is a representation of the amount of unwanted signal transmitted into the wrong beam. There are two major contributors to beam to beam isolation: 1) coupling from non-radiating feed network components (e.g. Butler matrix), and 2) coupling from radiating network components (e.g. radiating beams). Also, while a Butler Matrix itself typically has directivity of roughly 20 dB, when added to the azimuth side lobes it results in poor beam to beam isolation of roughly 15 dB for a multiple beam antenna.

In contrast, multi-lens based antenna arrays have superior performance in several key performance metrics compared to aforementioned antenna systems including: 1) the ability to provide large electrical down tilt angles for the main output beam while configured to maintain gain, beam width, cross polarization discrimination (cross-pol), and side lobe levels (SLL), 2) a reduction in the number of radiating elements compared to non-lens based antennas, 3) a higher antenna efficiency, 4) an ability to form multiple beam arrays using a common aperture without utilizing a Butler Matrix.

Multiple beams, multi-lens antenna arrays are very useful in 4G and 5G wireless networks as they increase capacity while maintaining antenna size and volumes similar to single beam antennas and are easily combined in multiple column arrays for 4×4 multiple input/multiple output (MIMO). However, a limitation of all multiple beam antenna arrays is the side lobes (SLL) in the azimuth plane. As the azimuth SLL increases, the network has a more difficult time discriminating between output beams. Voltage Standing Wave Ratio (VSWR) alarms, coupled to the RF elements, are based on power received due to a transmitter signal, such that when a multiple beam antenna has poor beam to beam isolation, a transmit power imbalance between beams due to higher traffic into a beam can cause VSWR alarms. This is a major drawback to multiple beam antennas.

Upper side lobes are undesirable in the vertical plane. To reduce side lobes vertically oriented linear arrays taper amplitude and phase across the RF elements, typically with highest amplitude in the center elements. Grating lobes occur whenever the spacing between elements is less than one half wavelength. Grating lobes are reduced by the amplitude taper of the individual elements in the vertical plane. As an example, if a grating lobe occurs at 60 degrees from the beam peak and the element pattern is down 10 dB at 60 degrees the grating lobe will be attenuated by 10 dB. This effect is more pronounced when the array elements are lenses due to the narrower element pattern from a typical RF lens. Lens spacings of over two wavelengths are possible with standard tilt and side lobe levels. These two techniques, amplitude and phase taper between elements and reducing grating lobes by element pattern power roll off, are used extensively in base station antenna design.

The novel technique described here leverages the benefit of lens based RF array antennas. The novel approach consists of rotating or "squinting" the feeds by rotating the feeds of one array element slightly one direction and the feeds of a different array element slightly in the opposite direction. In a preferred embodiment, the technique reduces azimuth side lobes and decreases performance variation across the frequency band.

Side lobes in the azimuth plane are undesirable as they increase signal to interference plus noise (SINR) ratio. In Matsing U.S. Pat. No. 11,431,099 a method is described for reducing azimuth side lobe levels that involves disturbing the linear array in a way to provide a degree of cancelation. The drawback to this technique is the additional room to create the non-linear array spacings. The arrangement described here provides modest azimuth side lobe reduction and also provides consistent beam width across a large bandwidth.

The present invention is based on the recent advances in meta materials (U.S. Pat. No. 8,518,537) and is a further extension of the initial patent issued for arraying together lens antennas using plane waves (U.S. Pat. No. 9,728,860). When feeds are aligned as described in U.S. Pat. No. 9,728,860 the resulting radiation patterns are consistent with a widely spaced array of narrow beam elements contained in a single antenna—the novelty of the U.S. Pat. No. 9,728, 860. However, if alternating feeds are rotated slightly in one direction and the other this creates an adjustment to the pattern performance. One result of this modification is it keeps the 3 dB and 10 dB beam widths consistent across a wide band width. A second result is it creates a reduction in azimuth side lobe levels.

In a preferred embodiment, the vertical pattern for Base Station Antennas consists of reduced side lobes above the beam peak and higher side lobes below the beam peak with negligible reduction in directivity, compared to no side lobe mitigation. Antennas on a typical tower have low upper side lobes to reduce interference to other cells while providing as much pattern as possible near in to the tower. By down tilting the individual elements at a tilt larger than the tilt produced by the relative phase between the elements the element pattern is positioned for greater attenuation above the main beam and less attenuation below the main beam. This "pre-tilt" technique consists of limitless variations of how much pre-tilt for each element in the array, creating different pre-tilt for different elements of the array, and keeping some elements at a fixed tilt over the range of antenna tilts. Advantageously, this technique can be used for any antenna array but when RF lens arrays are used more significant performance improvement is possible due to the narrow element patterns.

RF lens-based antenna sub-systems find wide use outside the area of wireless communication systems for the reasons previously mentioned; low weight, superior beam isolation, consistent performance over scan angle. The use of RF lens-based antenna sub-systems in satellite tracking systems is a recent area of industry focus.

The scalable approach described here extends the teaching of satellite tracking to include a switched beam system that does not require rapid repositioning of beams, but instead relies on the rapid switching between beams located at different positions and with higher resolution. This approach uses low noise amplifiers (LNAs) and transmit amplifiers with RF switching and distribution systems to place the output area of an output beam in a desired location, without the use of phase shifters. In place of phase shifters that provide continuous scanning, a switched beam architecture is presented, providing higher performance by accurately configuring multiple output beams using highly reliable switching techniques. In the receive path, the Low Noise Amplifiers (LNAs) limit the deterioration in the signal to noise (S/N) ratio which keeps a high signal integrity through the RF switching and distribution matrix.

Phase shifters are used when beam position needs to be finely tuned to a specific location. When multiple emitters are to be tracked a more efficient method of tracking is to provide a cluster of high gain, narrow beam width beams, placing the emitters in a given beams' output area, which can be scaled to even more narrow beams by arraying together lenses with beams pointing in the same area of the sky.

The tracking of RF signal emitters (e.g. satellites, aircraft, missiles, etc.) has evolved over many decades. The goal of these RF signal tracking systems is to acquire the emitters RF signal, pinpoint the look angle (e.g. elevation and azimuth), and maintain tracking as the emitter moves relative to the receiver. Several proven techniques exist. One example technique is the Monopulse technique, where position is determined through a feedback system keeping the object in the center of the difference pattern. Another example is the giant PAVE-PAWS radar, installed strategically around the northern hemisphere, that are capable of tracking numerous high velocity emitters simultaneously. These two examples highlight the tradeoff between nimble tracking of a single emitter (e.g. monopulse) and the ability to track many emitters simultaneously (e.g. PAVE-PAWS). RF emitter tracking systems are often installed on aircraft, ships, and vehicles where size, weight, wind load, and structural considerations are paramount.

SUMMARY OF THE INVENTION

The inventive subject matter provides apparatus, systems and methods in which an antenna uses an array of spherical lenses that places the feeds for the array in such a way so as to reduce variation in pattern variation over the band width and reduce azimuth side lobe levels. Lens based antennas using light weight dielectric material have seen a growing market for several applications including base station antennas, stadium antennas, special event antennas, and satellite tracking antennas. In general, the side lobes generated by a given antenna are unwanted. One exception are side lobes in the vertical plane below the main beam. These side lobes help provide coverage near into the tower, in the case of base station antennas. Any technique that can reduce unwanted side lobes with minimal impact on other antenna parameters such as gain, beam widths, cross polarization levels, would likely be advantageous for the operation of lens based antennas.

Numerous techniques exist to reduce side lobes. However, the specific technique utilized depends on the type of antenna. All techniques are based on antenna theory that teaches the far field pattern is the Fourier Transform of the near field pattern. The Fourier Transform of a step function, which can be thought of as 1) no power, 2) then equal power over distance, then 3) no power, as a sin x/x function. This represents the worst-case side lobe scenario. In a real-life antenna this corresponds to having no tapering of amplitude or phase over the aperture or equivalent, such as constant amplitude across a set of element in an array. Conversely, the Fourier Transform of a Gaussian distribution is another Gaussian distribution—which represents the absence of all side lobes. This means the more a set of amplitude and phase coefficients representing the amplitude and phase components of the array elements can conform to a Gaussian distribution the lower the side lobes. Various other techniques have been developed for optimal trade-off in antenna arrays between the amplitude and phase tapers across the elements and the far-field side lobes, including a technique using Tchebychev polynomials.

These phase tapering techniques only apply to arrays with three or more elements. You cannot taper a two-element array. Another common side lobe where tapering techniques have no effect is the grating lobe caused when elements of an array are spaced more than one half wavelength apart. An important advantage using RF lens-based antenna arrays is that the lenses, fed by one or more RF elements, can be spaced much wider than one half wavelength. In a preferred embodiment, the lenses are spaced at least two wavelengths apart. The reason for this is the grating lobe is attenuated by the element pattern that is much narrower than a conventional antenna array that does not use RF lenses. This behavior of RF lens-based antenna arrays has led to the technique described where creating an otherwise undesirable "pre-tilt" reduces the upper grating lobe.

The other technique described here involves designing RF lens arrays where the RF element remains fixed. This is a straightforward technique used in traditional base station antennas, but can be useful in RF lens-based antenna arrays over a limited scan range when the architecture of the antenna does not allow for movement of the elements and limited tilt range is acceptable.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 3 illustrates an alternative antenna system having two-dimensional tracks.
FIG. 11A illustrates the top down perspective of an alternative antenna system with a first, a second, and a third lens in a staggered arrangement.
FIG. 11B illustrates the front-facing perspective of an alternative antenna system with a first, a second, and a third lens in a staggered arrangement.
FIG. 11C illustrates the side-view perspective of an alternative antenna system with a first, a second, and a third lens in a staggered arrangement.

DETAILED DESCRIPTION

Figure 1A:
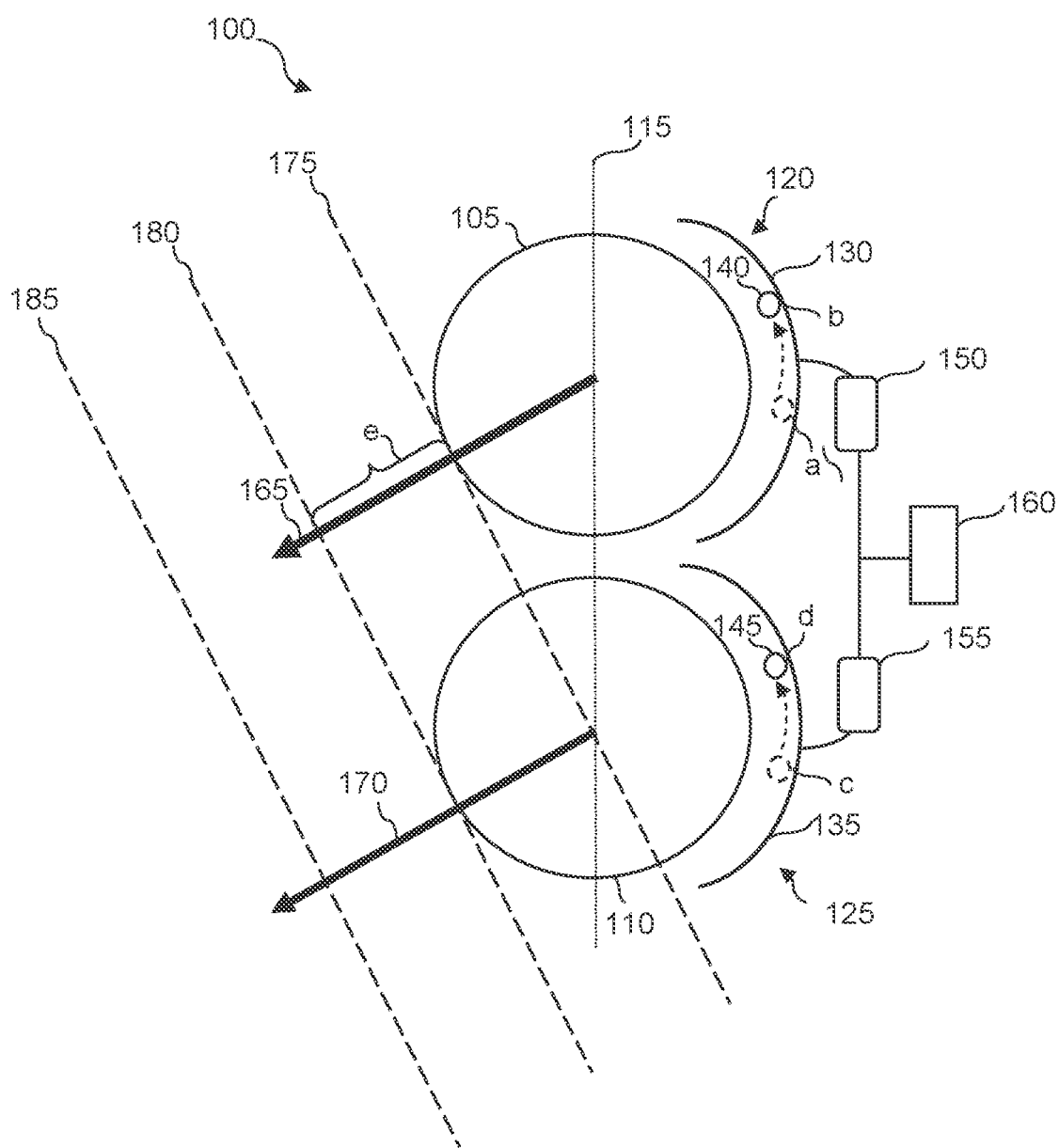
FIG. 1A illustrates an exemplary antenna system.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multicore processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used herein, and unless the context dictates otherwise, the term "stagger" is defined as the perpendicular offset between at least two virtual axis'.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In one aspect of the inventive subject matter, an antenna uses an array of spherical lens and mechanically movable elements along the surface of the spherical lens to provide coverage for a small, focused geographical area. In some embodiments, the antenna includes at least two spherical lens aligned along a virtual axis. The antenna also includes an element assembly for each spherical lens. Each element assembly has at least one track that curves along the contour of the exterior surface of the spherical lens and along which a radio frequency (RF) element can move. In preferred embodiments, the track allows the RF element to move in a direction that is parallel to the virtual axis. The antenna also includes a phase shifter that is configured to adjust a phase of the signals produced by the RF elements. The antenna includes a control mechanism that is connected to the phase shifter and the RF elements. The control mechanism is configured to enable a user to move the RF elements along their respective tracks, and automatically configure the phase shifter to modify a phase of the output signals from the elements based on the relative positions between the RF elements.

FIG. 1A illustrates an antenna system 100 according to some embodiments of the inventive subject matter. In this example, the antenna system 100 includes two spherical lenses 105 and 110 that are aligned along a virtual axis 115 in a three-dimensional space. It is noted that although only two spherical lenses are shown in this example, more spherical lens can be aligned along the virtual axis 115 in the antenna system 100. A spherical lens is a lens with a surface having a shape of (or substantially having a shape of) a sphere. As defined herein, a lens with a surface that substantially conform to the shape of a sphere means at least 50% (preferably at least 80%, and even more preferably at least 90%) of the surface area conforms to the shape of a sphere. Examples of spherical lenses include a spherical-shell lens, the Luneburg lens, etc. The spherical lens can include only one layer of dielectric material, or multiple layers of dielectric material. A conventional Luneburg lens is a spherically symmetric lens that has multiple layers inside the sphere with varying indices of refraction.

The antenna system 100 also includes an element assembly 120 associated with the spherical lens 105, and an element assembly 125 associated with the spherical lens 110. Each element assembly includes at least one track. In this example, the element assembly 120 includes a track 130 while the element assembly 125 includes a track 135. As shown, each of the tracks 130 and 135 has a shape that substantially conforms to (curves along) the exterior surface of its associated spherical lens. The tracks 130 and 135 can vary in length and in dimensions. In this example, the tracks 130 and 135 are one-dimensional and oriented along the virtual axis 115. In addition, each of the tracks 130 and 135 covers less than half of a circle created by the respective spherical lens. However, it is contemplated that the tracks 130 and 135 can have different orientation (e.g., oriented in perpendicular to the virtual axis 115, etc.), can be two-dimensional (or multi-dimensional), and/or can cover smaller or larger portions of the surface areas of the spherical lenses 105 and 110 (e.g., covering a circumference of a circle created by the spherical lenses 105 and 110, covering a hemispherical area of the spherical lenses 105 and 110, etc.).

Each of the element assemblies 120 and 125 also houses at least one RF element. An RF element can include an emitter, a receiver, or a transceiver. As shown, the element assembly 120 houses an RF element 140 on the track 130, and the element assembly 125 houses an RF element 145 on the track 135. In this example, each of the element assemblies 120 and 125 only includes one RF element, but it has been contemplated that each element assembly can house multiple RF elements on one or more tracks.

In exemplary embodiments, each RF element (from RF elements 140 and 145) is configured to transmit an output signal (e.g., a radio frequency signal) in the form of a beam to the atmosphere through its corresponding spherical lens. The spherical lens allows the output RF signal to narrow so that the resultant beam can travel a farther distance. In addition, the RF elements 140 and 145 are configured to receive/detect incoming signals that have been focused by the spherical lenses 105 and 110.

Each RF element (of the RF elements 140 and 145) is physically connected to (or alternatively, communicatively coupled with) a phase shifter for modifying a phase of the output RF signal. In this example, the RF element 140 is communicatively coupled to a phase shifter 150 and the RF element 145 is communicatively coupled to a phase shifter 155. The phase shifters 150 and 155 are in turn physically connected to (or alternatively, communicatively coupled with) a control mechanism 160.

The control mechanism 160 includes a mechanical module configured to enable a user to mechanically move the RF elements 140 and 145 along the tracks 130 and 135, respectively. The interface that allows the user to move the RF elements can be a mechanical rod or other physical trigger. It is noted that the mechanical rod can have a shape such as a cylinder, a flat piece of dielectric material, or any kind of elongated shape. In some embodiments, the control mechanism 160 also includes an electronic device having at least one processor and memory that stores software instructions, that when executed by the processor, perform the functions and features of the control mechanism 160. The electronic device of some embodiments is programmed to control the movement of the RF elements 140 and 145 along the tracks 130 and 135, respectively. The electronic device can also provide a user interface (e.g., a graphical user interface displayed on a display device, etc.) that enables the user to control the movement of the RF elements 140 and 145. The electronic device can in turn be connected to a motor that controls the mechanical module. Thus, the motor triggers the mechanical module upon receiving a signal from the electronic device.

For example, the control mechanism 160 can move the RF element 140 from position 'a' (indicated by dotted-line circle) to position 'b' (indicated by solid-line circle) along the track 130, and move the RF element 145 from position 'c' (indicated by dotted-line circle) to position 'd' (indicated by solid-line circle) along the track 135. By moving the RF elements to different positions, the antenna system 100 can dynamically change the geographical coverage area of the antenna 100. It is also contemplated that by moving multiple RF elements and arranging them in different positions, the antenna system 100 can also dynamically change the coverage size, and capacity allocated to different geographical areas. As such, the antenna system 100, via the control mechanism 160, can be programmed to configure the RF elements to provide coverage at different geographical areas and different capacity (by having more or less RF elements covering the same geographical area) depending on demands at the time.

For example, as the control mechanism 160 moves the RF elements 140 and 145 from positions 'a' and 'c' to positions 'b' and 'd,' respectively, the antenna system 100 can change the geographical coverage area to an area that is closer to the antenna system 100. It is also noted that having multiple spherical lenses with associated RF element allow the antenna system 100 to (1) provide multiple coverage areas and/or (2) increase the capacity within a coverage area. In this example, since both of the RF elements 140 and 145 associated with the spherical lenses 105 and 110 are directing resultant output signal beams at the same direction as indicated by arrows 165 and 170

However, it is noted that in an antenna system where multiple spherical lenses are aligned with each other along a virtual axis (e.g., the virtual axis 115), when multiple RF elements are transmitting output RF signals through the multiple spherical lenses at an angle that is not perpendicular to the virtual axis along which the spherical lenses are aligned, the signals from the different RF elements will be out of phase. In this example, it is shown from the dotted lines 175-185 that the output signals transmitted by the RF elements 140 and 145 at positions 'b' and 'd,' respectively, are out of phase. Dotted lines 175-185 are virtual lines that are perpendicular to the direction of the resultant output signal beams transmitted from RF elements 140 and 145 at positions 'b' and 'd,' respectively. As such, dotted lines 175-185 indicate positions of advancement for the resultant output beams. When the output signal beams are in phase, the output signal beams should have the same progression at each of the positions 175-185. Assuming both RF elements 140 and 145 transmit the same output signal at the same time, without any phase adjustments, the output signal beams 165 and 170 would have the same phase at the time they leave the spherical lenses 105 and 110, respectively. As shown, due to the directions the beams are transmitted with respect to how the spherical lenses 105 and 110 are aligned (i.e., the orientation of the virtual axis 115), the position 175 is equivalent to the edge of the spherical lens 105 for the signal beam 165 but is equivalent to the center of the spherical lens 110 for the signal beam 170. Similarly, the position 180 is away from the edge of the spherical lens 105 for a distance 'e' while the position 180 is equivalent to the edge of the spherical lens 110. As such, to make the signal beams 165 and 170 in phase, the control mechanism 160 configures the phase shifters 150 and 155 to modify (or adjust) the phase of the output signal transmitted by either RF element 140 or 145, or both output signals transmitted by RF elements 140 and 145. In this example, the control mechanism 160 can adjust the phase of the output signal transmitted by RF element 145 by a value equivalent to the distance 'e' such that output signal beams 165 and 170 are in-phase.

In other embodiments, the control mechanism 160 is configured to automatically determine the phase modifications necessary to bring the output beams in-phase based on the positions of the RF elements. It is contemplated that a user can provide an input of a geographical areas to be covered by the antenna system 100 and the control mechanism 160 would automatically move the positions of the RF elements to cover the geographical areas and configure the phase shifters to ensure that the output beams from the RF elements are in phase based on the new positions of the RF elements.

Figure 1B:
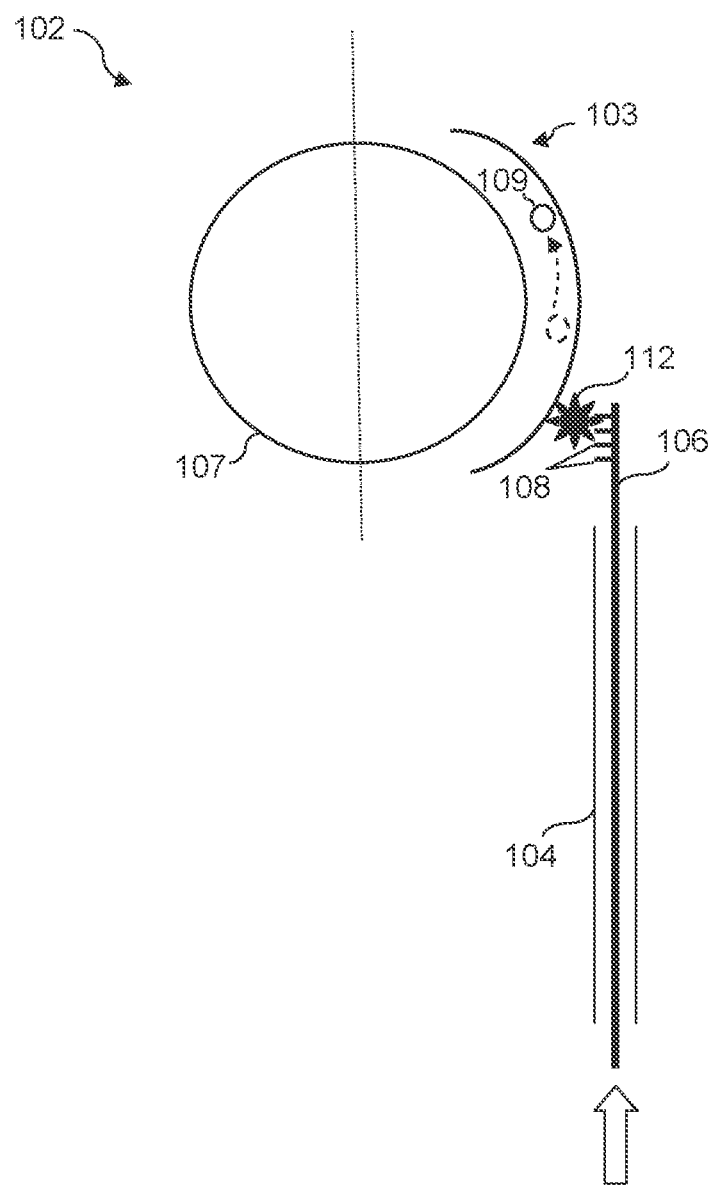
FIG. 1B illustrates an exemplary control mechanism.

FIG. 1B illustrates an example of a control mechanism 102 attached to element assembly 103 that is associated with the spherical lens 107. The mechanical module 102 includes a housing 104, within which a rod 106 is disposed. Rod 106 has teeth 108 configured to rotate a gear 112. The gear can in turn control the movement of the RF element 109. Under this setup, a person can manually adjust the position of the RF element 109 by moving the rod 106 up and down. It has been contemplated that rod 106 can be extended to reach other element assemblies (for example, an element assembly and spherical lens that are stacked on top of the spherical lens 107). That way, the rod can effectively control the movement of RF elements associated with more than one spherical lens.

A phase shifter can be implemented within the same mechanism 102, by integrating the rod 106 into the phase shifter design. When the rod is integrated into the phase shifter, adjusting the position of the rod 106 in this manner modifies the phase of an output signal transmitted by the RF element 109. It is noted that one can configure the position of rod 106 and the gear 112 such that the position of the RF element 109 and the phase modification is in-sync. This way, one can simply provide a single input (moving the rod up or down by a distance) to adjust both the position of the RF element 109 and the phase of the output signal.

It is also contemplated that an electric device (not shown) can be connected to the end of the rod (not attached to gear 112). The electric device can control the movement of the rod 106 based on an input electronic signal, thereby controlling the movement of the RF element 109 and the phase adjustment of the output signal. A computing device (not shown) can communicatively couple with the electric device to remotely control the RF element 109 and the phase of the output signal.

Figure 2B:
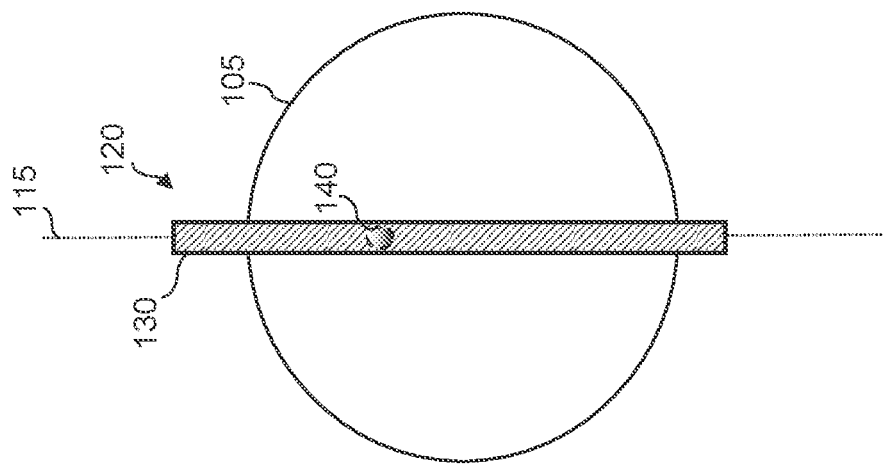
FIGS. 2A and 2B illustrate the front and back perspectives, respectively, of a spherical lens having one-dimensional tracks.
Figure 2A:
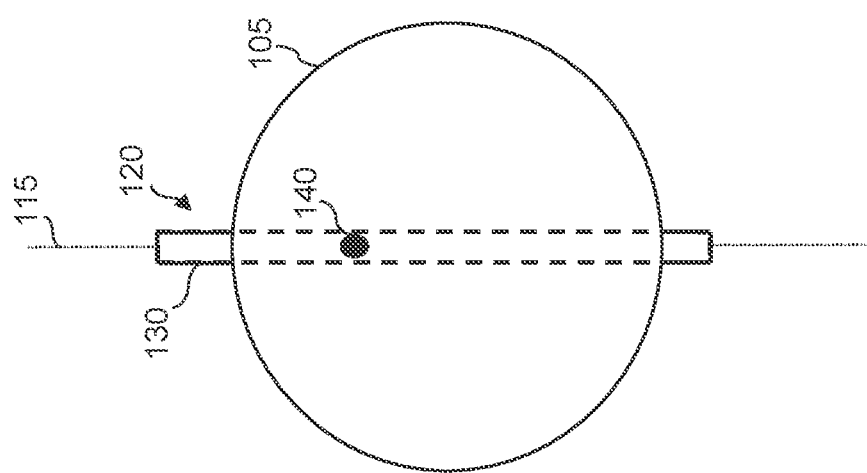

FIGS. 2A and 2B illustrate the spherical lens 105 and the element assembly 120 from different perspectives. Specifically, FIG. 2A illustrates spherical lens 105 from a front perspective, in which the element assembly 120 (including the track 130 and the RF element 140) appear to be behind the spherical lens 105. In this figure, the signals emitting from the RF element 140 are directed outward from the page. FIG. 2B illustrates spherical lens 105 from a back perspective, in which the element assembly 120 (including the track 130 and the RF element 140) appear to be behind the spherical lens 105. In this figure, the signals emitting from the RF element 140 are directed into the page.

FIG. 3 illustrates an antenna 300 in which the tracks associated with the spherical lens are two dimensional and each track associated with a spherical lens includes two RF elements. The antenna 300 is similar to the antenna 100 of FIG. 1. As shown, the antenna 300 has two spherical lenses 305 and 310 aligned along a virtual axis 315 in a three-dimensional space. The spherical lens 305 has an associated element assembly 320, and the spherical lens 310 has an associated element assembly 325. The element assembly 320 has a track 330, and similarly, the element assembly 325 has a track 335. The tracks 330 and 335 are two dimensional.

In addition, each of the tracks 330 and 335 includes two RF elements. As shown, track 330 has RF elements 340 and 345, and track 335 has RF elements 350 and 355. The two-dimensional tracks 330 and 335 allows the RF elements 340-355 to move in a two dimensional field in their respective tracks. In exemplary embodiments, the antenna 300 creates groups of RF elements, where each group consists of one RF element from each element assembly. In this example, the antenna 300 has two groups of RF elements. The first group of RF elements includes the RF element 340 of element assembly 320 and the RF element 350 of the element assembly 325. The second group of RF elements includes the RF element 345 of element assembly 320 and RF element 355 of the element assembly 325. The antenna 300 provides a control mechanism and phase shifter for each group of RF elements. In this example, the antenna 300 provides a control mechanism and phase shifter 360 (all in one assembly) for the first group of RF elements and a control mechanism and phase shifter 365 for the second group of RF elements. The control mechanism and phase shifters are configured to modify the positions of the RF elements within the group and to modify the phase of the output signals transmitted by the RF elements in the group such that the output signals coming out for the respective spherical lenses 305 and 310 are in-phase.

Figure 4B:
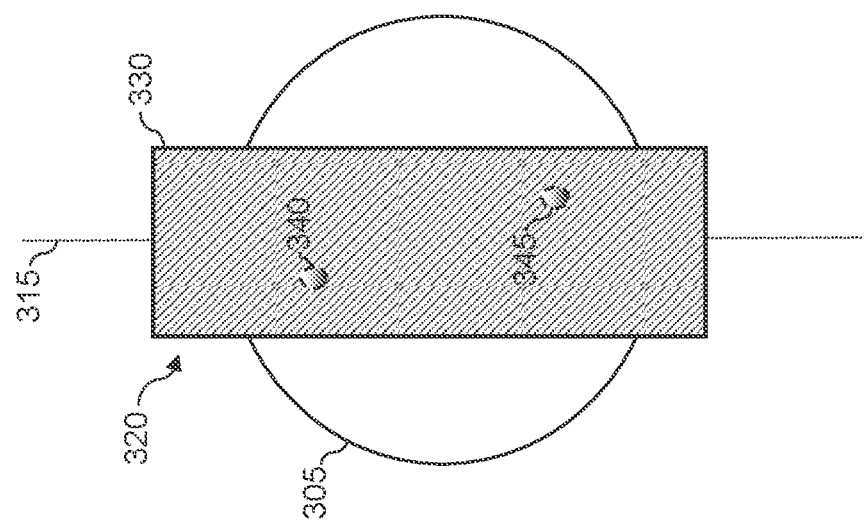
FIGS. 4A and 4B illustrate the front and back perspectives, respectively, of a spherical lens having a two-dimensional track.
Figure 4A:
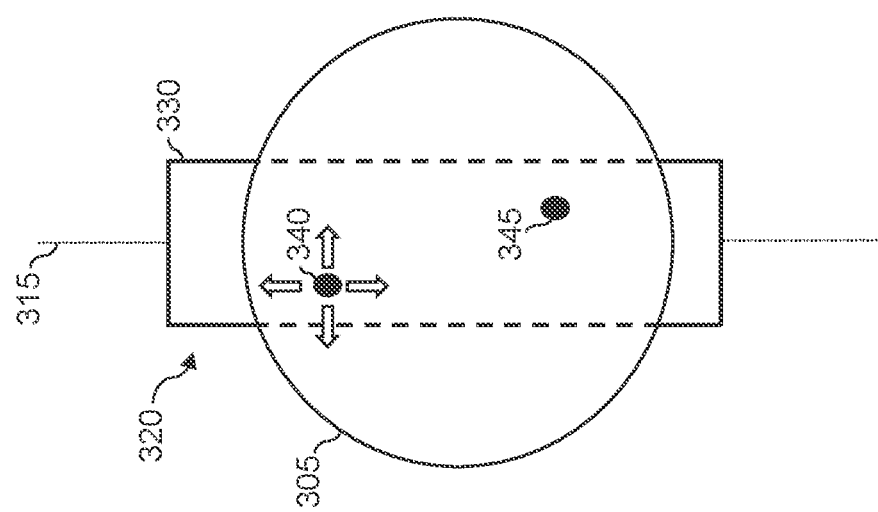

FIGS. 4A and 4B illustrates the spherical lens 305 and its element assembly 320 from different perspectives. Specifically, FIG. 4A illustrates the spherical lens 305 from a front perspective, in which the element assembly 320 (including the track 330 and the RF elements 340 and 345) appear to be behind the spherical lens 305. In this figure, the signals emitting from the RF element 340 and 345 are directed outward from the page. As shown, the RF elements 340 and 345 can move up and down (parallel to the virtual axis 315) or sideways (perpendicular to the virtual axis 315), as shown by the arrows near the RF element 340.

FIG. 4B illustrates the spherical lens 305 from a back perspective, in which the element assembly 320 (including the track 330 and the RF elements 340 and 345) appear to be behind the spherical lens 305. In this figure, the signals emitting from the RF elements 340 and 345 are directed into the page. It is contemplated that more than two RF elements can be installed in the same element assembly, and different patterns (e.g., 3×3, 4×3, 4×4, etc.) of RF element arrangements can be formed on the element assembly.

Referring to FIG. 3, it is noted that the RF elements that are in substantially identical positions with respect to their respective spherical lens are grouped together. For example, the RF element 340 is paired with the RF element 350 because their positions relative to their respective associated spherical lenses 305 and 310 are substantially similar. Similarly, the RF element 345 is paired with the RF element 355 because their positions relative to their respective associated spherical lenses 305 and 310 are substantially similar. It is contemplated that the manner in which RF elements are paired can affect the vertical footprint of the resultant beam (also known as polarized coincident radiation pattern) generated by the RF elements. As defined herein, the vertical footprint of an RF element means the coverage area of the RF element on a dimension that is parallel to the axis along which the spherical lenses are aligned. For practical purposes, the goal is to maximize the overlapping areas (also known as the cross polarized coincident radiation patterns) of the different resultant beams generated by multiple RF elements.

As such, in another aspect of the inventive subject matter, an antenna having an array of spherical lenses pairs opposite RF elements that are associated with different spherical lenses to cover substantially overlapping geographical areas. In some embodiments, each spherical lens in the array of spherical lenses has a virtual axis that is parallel with other virtual axes associated with the other spherical lenses in the array. One of the paired RF elements is placed on one side of the virtual axis associated with a first spherical lens and the other one of the paired RF elements is placed on the opposite side of the virtual axis associated with a second spherical lens. In preferred embodiments, the antenna also includes a control mechanism programmed to configure the paired RF elements to provide output signals to and/or receive input signals from substantially overlapping geographical areas.

Figure 5:
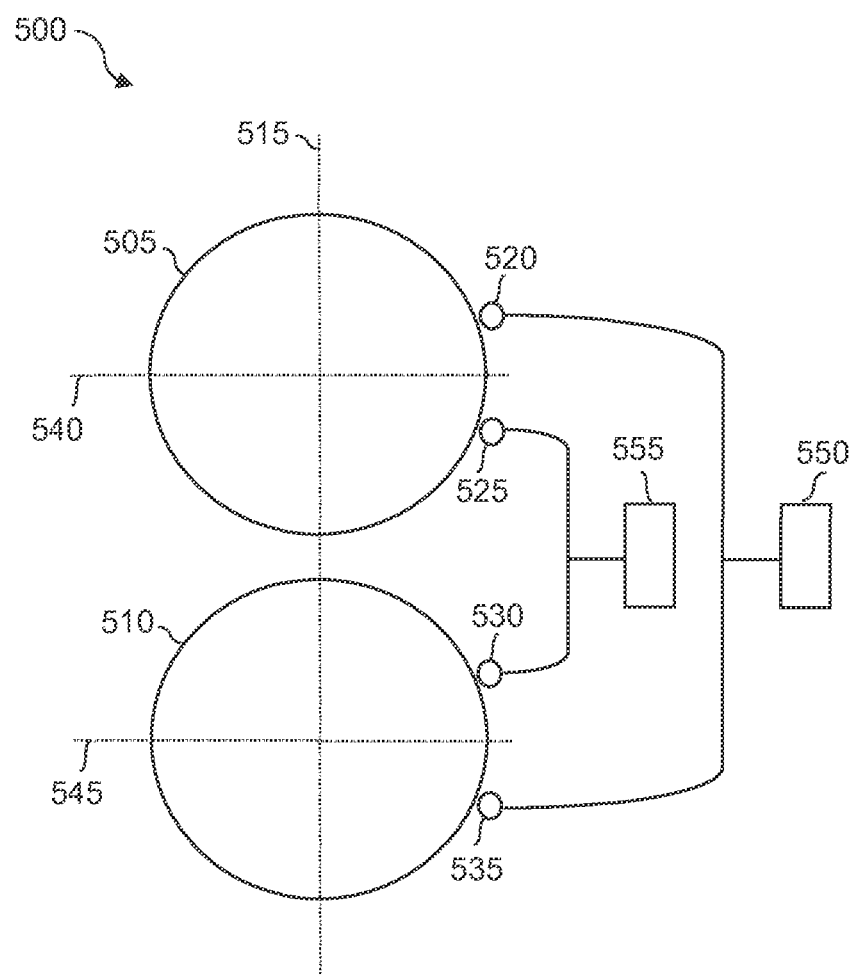
FIG. 5 illustrates an antenna that pairs opposite RF elements in the same group.

FIG. 5 illustrates an example of such an antenna 500 of preferred embodiments. The antenna 500 includes an array of spherical lens (including spherical lenses 505 and 510) that is aligned along an axis 515. Although the antenna 500 in this example is shown to include only two spherical lenses in the array of spherical lenses, it has been contemplated that the antenna 500 can include more spherical lenses that are aligned along the axis 515 as desired.

Each spherical lens also includes an RF element arrangement axis that is parallel to one another. In this example, the spherical lens 505 has an RF element arrangement axis 540 and the spherical lens 510 has an RF element arrangement axis 545. Preferably, the RF element arrangement axes 540 and 545 are perpendicular to the virtual axis 515 along which the spherical lenses 505 and 510 are aligned, as shown in this example. However, it has been contemplated that the RF element arrangement axes can be in any orientation, if they are parallel with each other.

As shown, each spherical lens in the array has associated RF elements. In this example, the spherical lens 505 has two associated RF elements 520 and 525, and the spherical lens 510 has two associated RF elements 530 and 535. The RF elements associated with each spherical lens are placed along the surface of the spherical lens, on different sides of the RF element arrangement axis. As shown, the RF element 520 is placed on top of (on one side of) the RF element arrangement axis 540 and the RF element 525 is placed on the bottom of (on the other side of) the RF element arrangement axis 540. Similarly, the RF element 530 is placed on top of (on one side of) the RF element arrangement axis 545 and the RF element 535 is placed on the bottom of (on the other side of) the RF element arrangement axis 545.

The antenna 500 also includes control mechanisms 550 and 555 for coordinating groups of RF elements. As mentioned before, it has been contemplated that pairing opposite RF elements that are associated with different spherical lens (i.e., pairing RF elements that are on opposite sides of the RF element arrangement axis) provides the optimal overlapping vertical footprints. Thus, the control mechanism 550 is communicatively coupled with the RF element 520 (which is placed on top of the RF element arrangement axis 540) and the RF element 535 (which is placed on the bottom of the RF element arrangement axis 545) to coordinate the RF elements 520 and 530 to provide signal coverage of substantially the same geographical area. Similarly, the control mechanism 555 is communicatively coupled with the RF element 525 (which is placed on the bottom of the RF element arrangement axis 540) and the RF element 530 (which is placed on the top of the RF element arrangement axis 545) to coordinate the RF elements 525 and 5530 to provide signal coverage of substantially the same geographical area. In some embodiments, the control mechanisms 550 and 555 also include phase shifters configured to modify the phase of the signals being output by their associated RF elements. Thus, this embodiment has an antenna assembly that includes a control mechanism but does not include phase shifters. Without phase shifters, the design and operation of the antenna assembly is simplified, but may have signals from output antennas that are slightly out-of phase.

In addition to the requirement that the grouped RF elements must be on different sides of the RF element arrangement axis, it is preferable that the distance between the RF elements and the RF element arrangement axis are substantially the same (less than 10%, and more preferably less than 5% deviation). Thus, in this example, the distance between the RF element 520 and the axis 540 is substantially the same as the distance between the RF element 535 and the axis 545. Similarly, the distance between the RF element 525 and the axis 540 is substantially the same as the distance between the RF element 530 and the axis 545.

While the RF elements 520-535 are shown to be placed at fixed locations in this figure, in some other embodiments, the antenna 500 can also include tracks that enable the RF elements to move to different positions along the surface of their respective spherical lenses. In these embodiments, the control mechanisms 550 and 555 are configured to coordinate their associated RF elements and phase shifters to send out synchronized signals to a covered geographical area.

Figure 6:
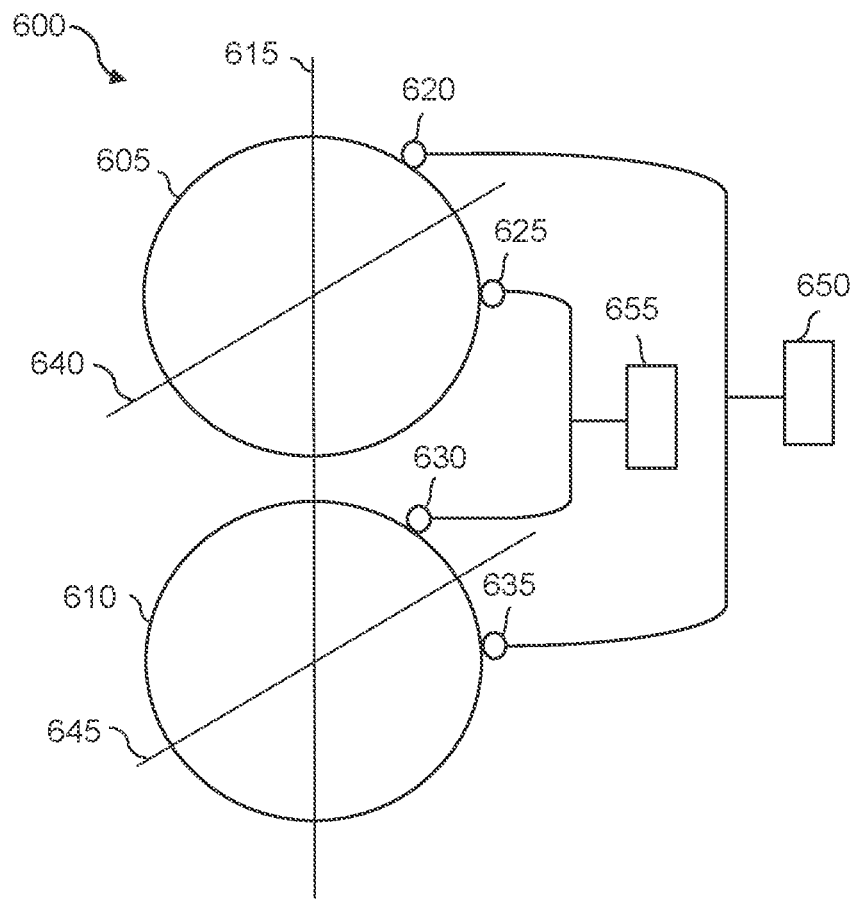
FIG. 6 illustrates another antenna that pairs opposite RF elements in the same group.

In the example illustrated in FIG. 5, the RF element arrangement axes are arranged to be perpendicular to the axis along which the spherical lenses are aligned. As mentioned above, the RF element arrangement axes can be oriented in different ways. FIG. 6 illustrates an antenna 600 having RF elements placed on different sides of RF element arrangement axes that are not perpendicular to the virtual axis along which the spherical lenses are aligned. The antenna 600 is almost identical to the antenna 500. The antenna 600 has an array of spherical lens (including spherical lenses 605 and 610) that is aligned along an axis 615. Although the antenna 600 in this example is shown to include only two spherical lenses in the array of spherical lenses, it has been contemplated that the antenna 600 can include more spherical lenses that are aligned along the axis 615 as desired.

Each spherical lens also includes an RF element arrangement axis that is parallel to one another. In this example, the spherical lens 605 has an RF element arrangement axis 640 and the spherical lens 610 has an RF element arrangement axis 645. As shown, the RF element arrangement axes 640 and 645 are not perpendicular to the virtual axis 615. By having the RF element arrangement axes in different orientations, the antenna 600 can be adjusted to cover different geographical areas (closer to the antenna, farther away from the antenna, etc.).

As shown, each spherical lens in the array has associated RF elements. In this example, the spherical lens 605 has two associated RF elements 620 and 625, and the spherical lens 610 has two associated RF elements 630 and 635. The RF elements associated with each spherical lens are placed along the surface of the spherical lens, on different sides of the RF element arrangement axis. As shown, the RF element 620 is placed on top of (on one side of) the RF element arrangement axis 640 and the RF element 625 is placed on the bottom of (on the other side of) the RF element arrangement axis 640. Similarly, the RF element 630 is placed on top of (on one side of) the RF element arrangement axis 645 and the RF element 625 is placed on the bottom of (on the other side of) the RF element arrangement axis 645.

The antenna 600 also includes control mechanisms 650 and 655 for coordinating groups of RF elements. The control mechanisms 650 and 655 are configured to pair opposite RF elements that are associated with different spherical lens (i.e., pairing RF elements that are on opposite sides of the RF element arrangement axis). Thus, the control mechanism 650 is communicatively coupled with the RF element 620 (which is placed on top of the RF element arrangement axis 640) and the RF element 635 (which is placed on the bottom of the RF element arrangement axis 645) to coordinate the RF elements 620 and 635 to provide signal coverage of substantially the same area. Similarly, the control mechanism 655 is communicatively coupled with the RF element 625 (which is placed on the bottom of the RF element arrangement axis 640) and the RF element 630 (which is placed on top of the RF element arrangement axis 645) to coordinate the RF elements 625 and 630 to provide signal coverage of substantially the same area. In exemplary embodiments, the control mechanisms 650 and 655 also include phase shifters configured to modify the phase of the signals being outputted by their associated RF elements.

Figure 7A:
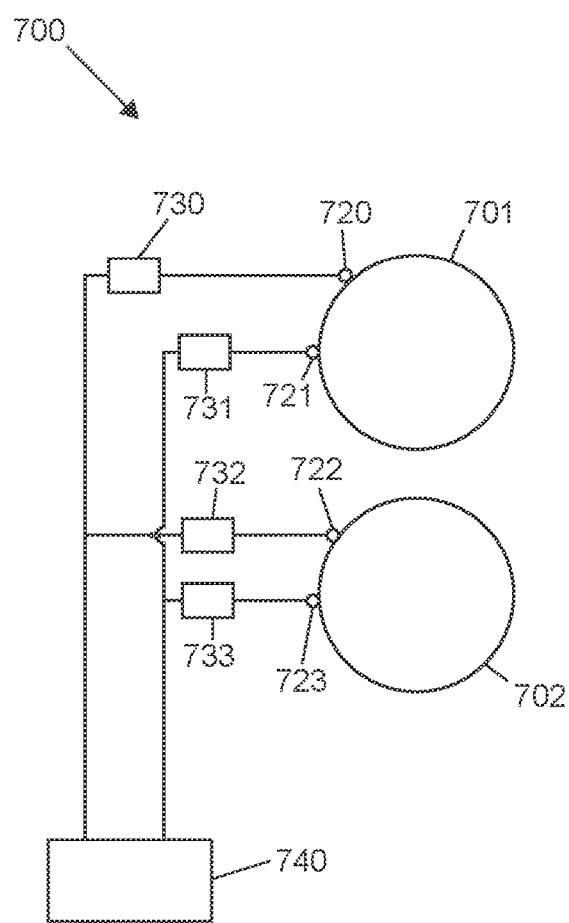
FIG. 7A illustrates an antenna array with a first and a second lens, each producing output beams via their RF element.
Figure 7B:
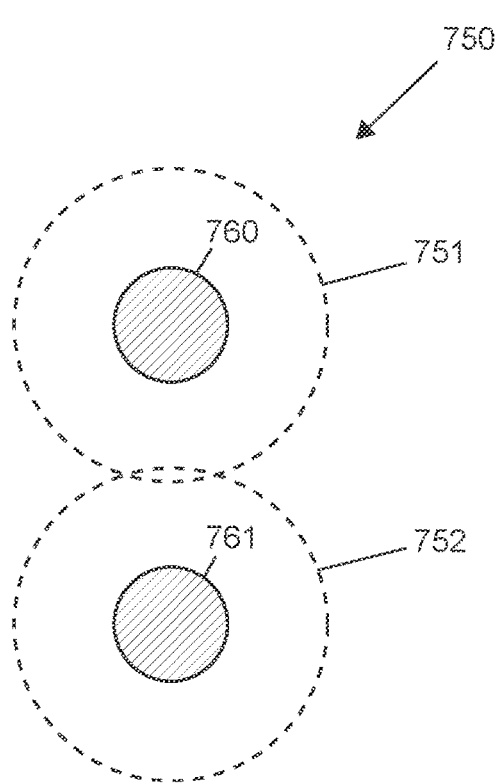
FIG. 7B illustrates the output areas of the first and second lenses.

FIGS. 7A and 7B illustrate an antenna similar to FIG. 3 and output areas associated with the antenna array 700, respectively. The array 700 has multiple lenses (including spherical lenses 701 and 702). Although array 700 in this example is shown to include only two spherical lenses in the array of lenses, it is contemplated that array 700 can include three or more lenses.

Each of the lenses include at least two RF elements, and two sub-controllers. In this example, lens 701 has RF elements 720 and 721, and lens 702 has RF elements 722 and 723. Each RF element has a sub-controller configured for phase shifting an output beam produced by the RF element. As shown, RF element 720 is coupled to sub-controller 730, RF element 721 is coupled to sub-controller 731, RF element 722 is coupled to sub-controller 732, and RF element 723 is coupled to sub-controller 733. Further, lens array 701 has two groupings of associated RF elements 720 and 722, and 721 and 723.

Each RF element generates an output beam, which is adjusted by its associated sub-controller, to produce an output area. In this example, the RF element 720 produce an output area 752, and the RF element 721 produce an output area 751. In another embodiment, RF element the RF element 722 produces an output area 752, and the RF element 723 produces an output area 751. In a preferred embodiment, Controller 740 can command the sub-controllers 730 and 732 to phase shift RF elements 720 and 722, respectively, to create an overlapped beam via constructive interference. In a related embodiment, controller 740 can command the RF elements 720 and 722 to produce or cease production of their respective output beams based on the movement of a target. The overlapped beam from RF elements 720 and 722 produces output area 761. As shown in output area grouping 750, output area 761 is narrower than output area 752, and can be phase shifted to move about within output area 752. Controller 740 can command the sub-controllers 731 and 733 to phase shift RF elements 721 and 723, respectively, to create an overlapped beam via constructive interference. The overlapped beam from RF elements 721 and 723 produces output area 760. As shown in FIG. 7B, output area 760 is narrower than output area 751, and can be phase shifted to move about within output area 751. The overlapped beams may operate simultaneously. The first and second overlapped may shift in concert or independently.

In certain configurations, lens 701 is collinear or non-collinear with lens 702. Additional antennas may be arranged in rows, coupled to antennas 701 and 702. Antenna rows may be parallel or non-parallel. In other configurations, rows of antennas may be closely packed. A "closely packed" lens arrangement may be embodied by at least two rows of lenses, clustered together such that a lens is diagonally situated from at least one other lens in the other lens row.

Figure 8A:
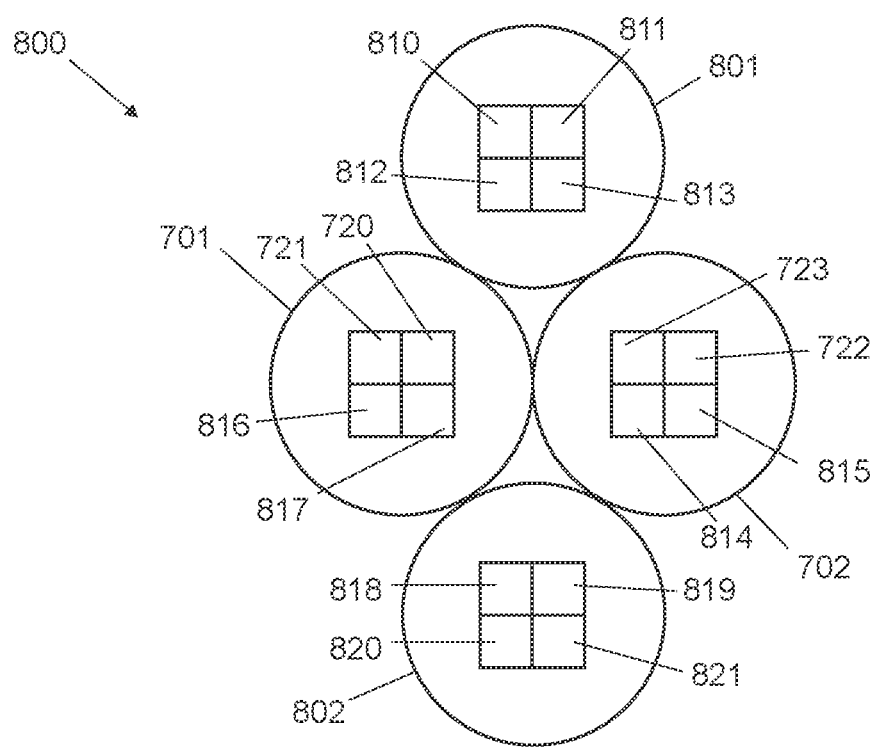
FIG. 8A illustrates the placement of RF elements on multiple lenses in an antenna array.

FIG. 8A illustrates an embodiment of the "closely packed" antenna arrangement. Antenna array 800 is like antenna array 700, except with additional antennas and RF elements. The array 800 has multiple lenses (including spherical lenses 701, 702, 801, and 802).

Each of the lenses include at least four RF elements, and four sub-controllers. Lens 701 has RF elements 720, 721, 816, and 817. Lens 702 has RF elements 722, 723, 814, and 815. Lens 801 has RF elements 810, 811, 812, and 813. Lens 802 has RF elements 818, 819, 820, and 821.

Figure 8B:
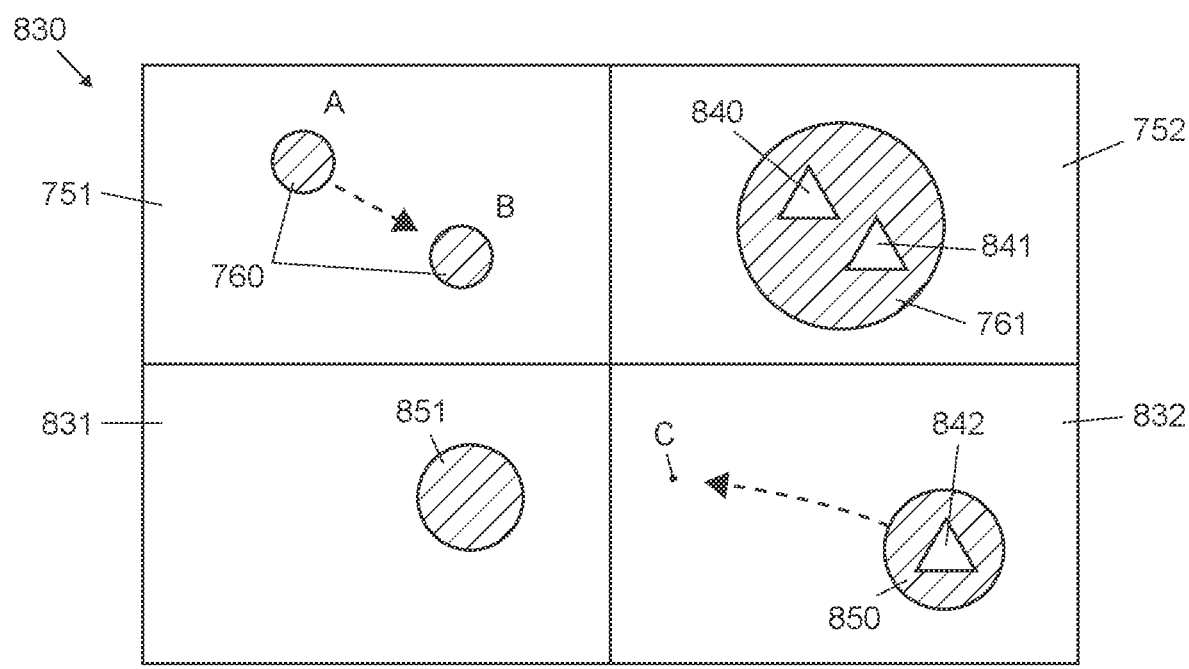
FIG. 8B illustrates the operation of output areas in various output area groupings.

Each RF element generates an output beam, which can be adjusted by its associated sub-controller, to produce an output area. In preferred embodiments, each RF element has a sub-controller configured such that when two beams from individual RF elements are combined, the relative phase generated by the two sub-controllers can move the position of the resulting output area within the contour of the larger output area. In FIG. 8B, the RF element 816 produces an output area 831, the RF element 817 produces an output area 832, the RF element 721 produces an output area 751, the RF element 720 produces output area 752.

In other embodiments, the RF element 812, 814, or 820 produces an output area 831, and the RF element 813, 815, or 821 produces an output area 832, the RF element 810, 723, or 818 produce an output area 751, the RF element 811, 722, or 819 produce output area 752. As shown in output area grouping 830, the output beams from RF elements 720, 722, and 819 are phase shifted to create an overlapped beam via constructive interference.

The overlapped beam from RF elements 721, 723, and 810 produces output area 760. RF elements 721, 723, and 810 can be phase shifted to track output area 760 from point A to point B. Output area 760 could be further narrowed via an additional output beam from RF element 818. Tracking output area 760 from point A to point B could be made in anticipation of a known target requiring coverage entering the output area 850.

An output area has a non-assigned state, where the output area is made as narrow or wide as necessary to provide coverage to any targets that may enter the output area. The output beams from RF elements 816 and 812 are phase shifted to create an overlapped beam via constructive interference. The overlapped beam from RF elements 816 and 812 produces output area 851. Output area 851 can be further narrowed including the output beams of at least one of RF elements 814 and 820 into the overlapped beam of RF elements 816 and 812.

An output area can also track a target. In this embodiment, output area 761 provides coverage to static targets 840 and 841. Output area 761 can be narrowed to focus on either target 840 or 841 via an overlapped output beam from RF element 811, 722, and 819. In other embodiments, an output area 850 tracks a dynamic target 842 (e.g. a satellite) across an area of sky to point C. The output beams from RF elements 817, 813, 821, and 815 are phase shifted to create an overlapped beam via constructive interference. This overlapped beam produces output area 850. Output area 850 is further phase shifted to track and provide coverage to target 842.

An output area provides an area of signal coverage in at least a portion of the sky or outer space. The dimensions of an output area can be user-input or autonomously generated via a controller 740. Each output area can be static or dynamic. Dynamic output areas can change according to variables, such as time or environmental conditions.

Figure 9:
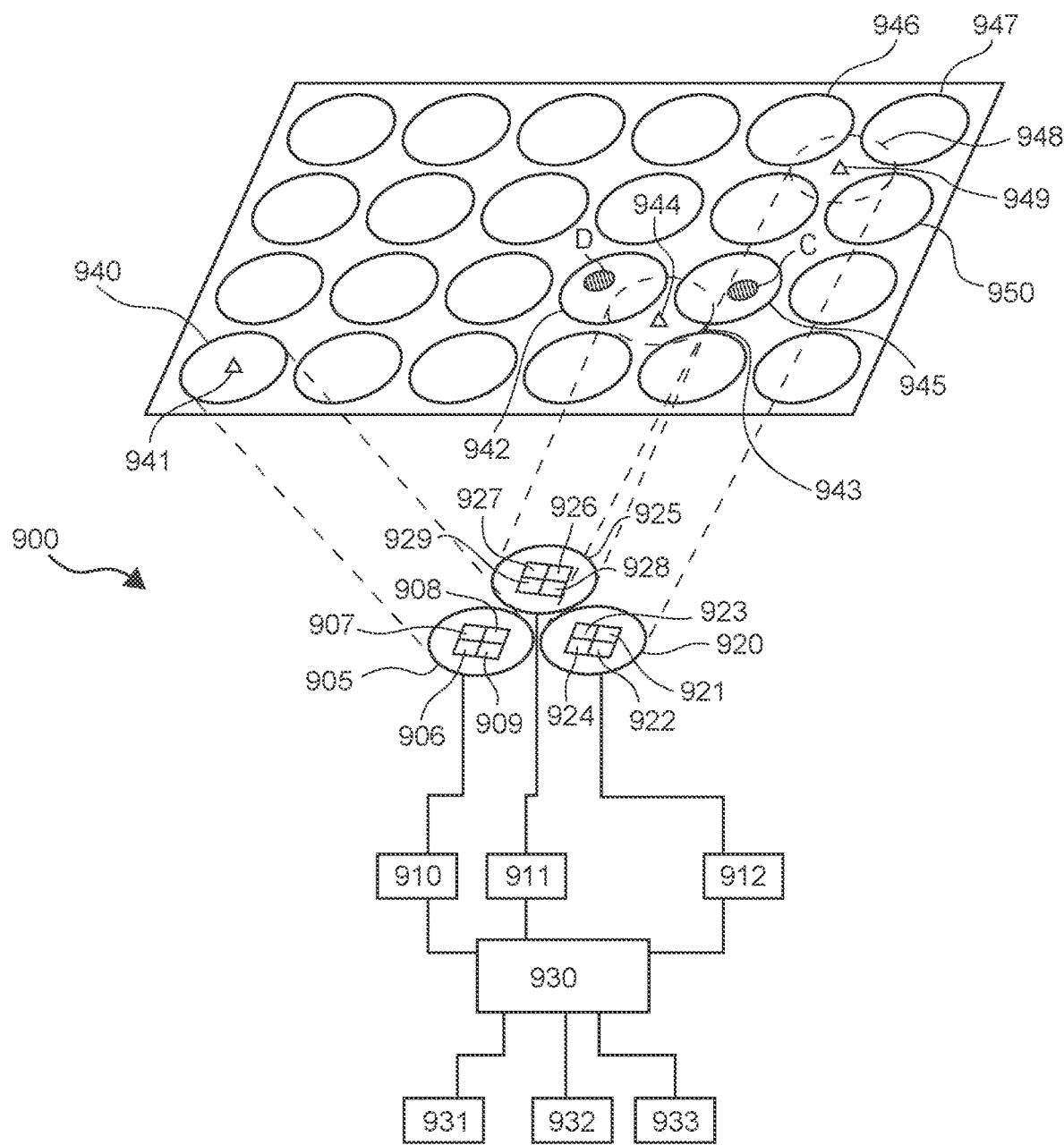
FIG. 9 illustrates an antenna arrangement with a first, a second, and a third lens, each producing output beams via their RF elements.

FIG. 9 illustrates another embodiment of the "closely packed" antenna arrangement. Antenna arrangement 900 is similar to antenna array 800, except the antenna arrangement 900 is configured for discriminating targets via phase shifters to place output beams in specific locations, rather than real time beam movement with targets. This approach is more amenable for tracking multiple targets simultaneously. The array 900 has multiple lenses (including spherical lenses 905, 920, and 925). Although antenna arrangement 900 in this example is shown to include only three spherical lenses, it is contemplated that antenna arrangement 900 can include four or more lenses. In a preferred embodiment, at least a first lens is positioned to provide coverage for an area of sky different from the area of sky serviced by a second, different lens. In exemplary embodiments, the lenses of antenna arrangement 900 are spherical. In alternative embodiments, at least one of the lenses of antenna arrangement 900 is non-spherical.

Each of the lenses includes at least four RF elements, one sub-controller, and one receiver. Lens 905 has RF elements 906, 907, 908, and 909. Lens 920 has RF elements 921, 922, 923, and 924. Lens 925 has RF elements 926, 927, 928, and 929. Each lens has a sub-controller configured for combining a first output beam produced by first RF element with a second output beam produced by a second RF element. As shown, lens 905 is coupled to sub-controller 910, lens 925 is coupled to sub-controller 911, and lens 920 is coupled to sub-controller 912.

An output area can have a fixed position, where the output area is directed toward a single area of sky to provide coverage to any targets that may enter the output area. The output beam from RF element 907 is activated to create output area 940 to provide coverage for dynamic target 941 (e.g. a satellite) within output area 940. The footprint of output area 940 is depicted as a circle. An output area can also track a target in between the output areas (e.g. circular footprints) generated via any single RF element. In an exemplary embodiment, RF elements 926 and 927 are activated to create combined output area 943 in order to track dynamic target 944 across an area of sky from point C in output area 945 to point D in output area 942. The output beams from RF elements 926 and 927 are combined to create a combined output area via constructive interference. The output beam from RF element 926 is activated to create output area 945, and output beam from RF element 927 is activated to create output area 942. Advantageously, a combined output area facilitates the smooth transition for tracking a satellite from the output area of a one RF element to another output area of another, different RF element.

In a related embodiment, RF elements 921, 922, and 923 are activated to create combined output area 948 in order to track dynamic target 949 as it travels in the gap between output area 946, output area 947, and output area 950. The output beams from RF elements 921, 922, and 923 are combined to create a combined output area via constructive interference. The output beam from RF element 923 is activated to create output area 946, the output beam from RF element 921 is activated to create output area 947, and the output beam from RF element 922 is activated to create output area 950.

In certain configurations, RF elements may be arranged in rows and columns, coupled to their respective lenses. RF element rows may be parallel or non-parallel. In other configurations, rows of RF elements may be closely packed. A "closely packed" RF element arrangement may be embodied by at least two rows of RF elements, clustered together such that an RF element is diagonally situated from at least one other RF element in the other RF element row. Spacing between RF elements is configured to be a dense arrangement so as to minimize gain loss in gaps between output beams.

Each dynamic target (of the dynamic targets tracked by RF elements associated with antenna arrangement 900) is assigned (or alternatively, communicatively coupled with) a receiver for communication with the dynamic target. In a preferred embodiment, controller 930 is configured for assigning a receiver to a target. Controller 930 may also reassign receivers and RF elements as a target is tracked across an output area. In exemplary embodiments, dynamic target 941 is assigned to receiver 931, dynamic target 944 is assigned to receiver 932, and dynamic target 949 is assigned to receiver 933. In exemplary embodiments, each dynamic target is assigned a single receiver. In alternative embodiments, two or more targets may be assigned to a single receiver, where the controller 930 will direct the single receiver to rapidly switch coverage between the plurality of targets. Each receiver is configured to receive from a target. In exemplary embodiments, each target is assigned a receiver. In addition, the RF elements of antenna arrangement 900 are configured to receive/detect incoming signals that have been focused by their associated lenses.

As shown, the lenses of antenna arrangement 900 are aligned along a virtual plane. In some embodiments, the virtual plane is parallel to the ground on top of which the antenna arrangement 900 is disposed. FIG. 9 shows an isometric projection of antenna arrangement 900, which depicts the array disposed above the ground. In preferred embodiments, the controller, sub-controllers, and receivers are disposed between the lenses and the ground. In alternative embodiments, at least one of the controller, sub-controllers, and receivers is aligned along the same virtual plane as the lenses of antenna arrangement 900. In yet another embodiment, at least one of the controller, sub-controllers, and receivers is aligned along a virtual plane different from that virtual plane along which the lenses of antenna arrangement 900 are aligned.

Figure 10:
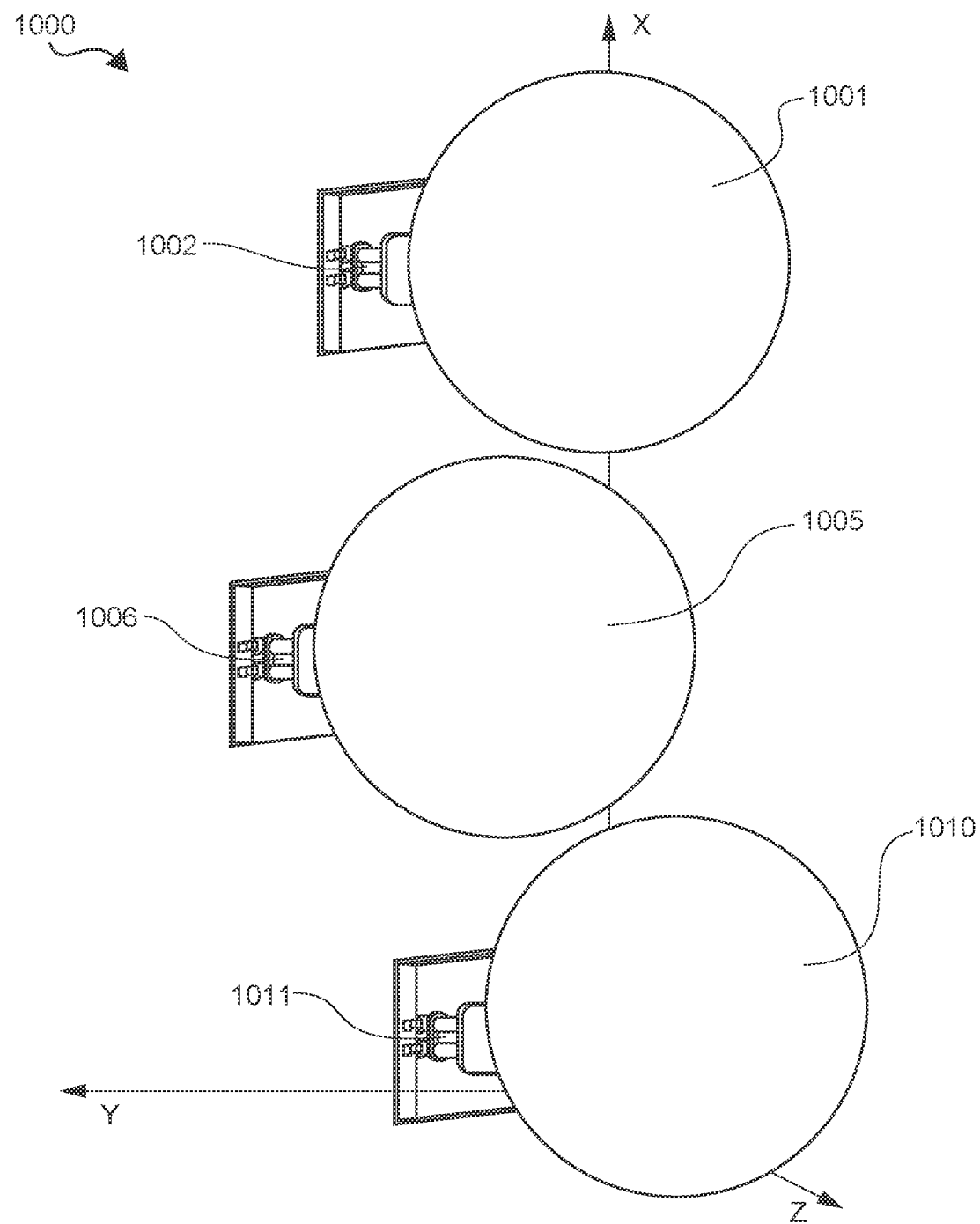
FIG. 10 illustrates an alternative antenna system with a first, a second, and a third lens in a staggered arrangement.

FIG. 10 illustrates the inventive concept for a three beam, three lens staggered array. The lenses and elements feeding the array 1000 are arranged along their virtual axis' with the exception of a 30 mm stagger horizontally from the virtual axis of one lens to the virtual axis of a different lens. In an exemplary embodiment, there are a total of nine dual polarized elements for a total of 18 antenna ports, each with a column of three elements for a given polarization arrayed using a 1:3 phase shifter, so the array 1000 has three dual polarized beams. Antenna array 1000 is like antenna system 100, and includes an additional spherical lens 1010, which along with lens 1001 and 1005, are each aligned along a different virtual axis in a three-dimensional space. The array 1000 has multiple lenses (including spherical lenses 1001, 1005, and 1010). Each of the lenses includes at least one RF element. Lens 1001 has RF element 1002. Lens 1005 has RF element 1006. Lens 1010 has RF element 1011.

In other embodiments, a second column of lenses and elements can be used to achieve 4×4 MIMO. In a preferred embodiment, the output beams of array 100 have their azimuth on the horizon. In a related embodiment, the output beams of array 100 are down-tilted beams, such that each RF element is rotated about the lens center to position the beams to coincide with the desired down tilt.

The lenses of array 1000 can be any shape and any combination of single or multiple dielectric constant layers. Lens based antenna arrays have the advantage of negligible grating lobes for array spacings (e.g. the spacing between lenses), which are larger than certain other traditional antennas due to the much narrower pattern from the individual lenses. This lens spacing allows the positions of the lens to be varied to reduce the azimuth SLL, as depicted by FIG. 10. In a preferred embodiment, the array 1000 has an Azimuth SLL ranging from 25-30 dB, which approximately correlates to a 12-15 dB improvement in the Azimuth SLL of a Butler Matrix based antenna.

FIGS. 11A-11C provide three perspectives of array 1100: top (11A), front (11B), and side (11C). In a preferred embodiment, the virtual axis' (1007 and 1012) through lens 1005 and lens 1010 are offset from the virtual axis 1003 of lens 1001 by 30 mm. In a related embodiment, lens 1005 has a virtual axis 1008 located 30 mm left from virtual axis 1004, and the lens 1010 has a virtual axis 1013 located 30 mm right from virtual axis 1004. In some embodiments, there is separation of 25 mm between the boresight virtual axis 1003 of lens 1001 and the boresight virtual axis 1007 of lens 1005.

Figure 12:
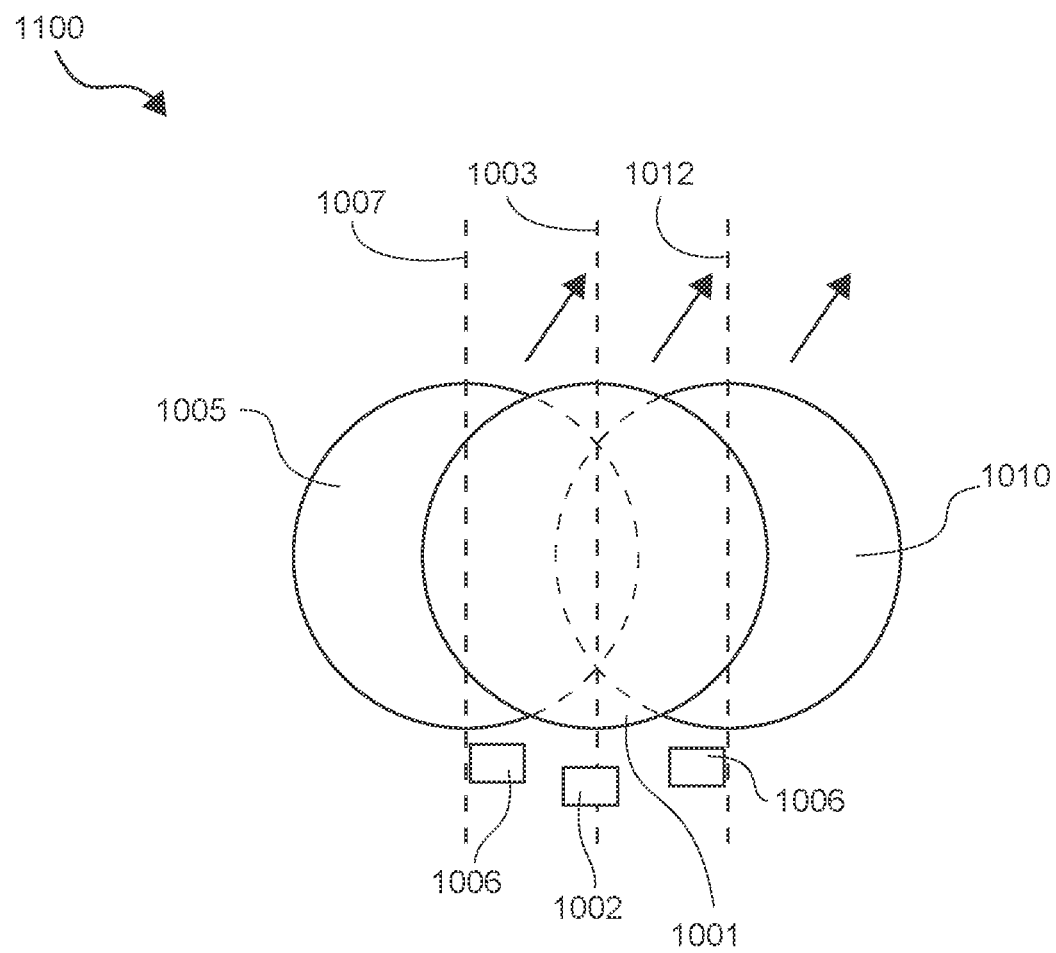
FIG. 12 illustrates the operation of an alternative antenna system depicted in FIG. 10.

FIG. 12 illustrates an embodiment of array 1000. The largest side lobes for the center output beam in the azimuth plane occur at approximately +/−40 degrees from the boresight virtual axis' (1007, 1003, and 1012), and are depicted by arrows for simplicity. The staggered spacing of the lenses is a function of the distance between at least two of the virtual axis' 1007, 1003, and 1012, and can be calculated by vector addition. In a preferred embodiment, lens 1001 is fed an amplitude equivalent to 1 volt, while lenses 1005 and 1010 are each fed amplitudes equivalent to 0.7 volts. In some embodiments, lenses 1005 and 1010 operate at half power, such that together they equal the power of lens 1001. In preferred embodiments, the stagger modifies the relative phase between the lenses 1001, 1005, and 1010 to create destructive interference and reduce the side lobes (SLL) in the +/−40-degree directions.

In a related embodiment, additional phase compensation is utilized to produce a similar reduction in side lobes for the output beams positioned at +/−40 degrees. In some embodiments, the RF elements producing the side beams will be phase delayed or phase progressed to bring the array of lenses into a coherent phase front in the direction of the beam peak (i.e. +/−40 degrees). In a related embodiment, the vertical patterns are used for an output beam directed along a virtual axis, and the introduced stagger has negligible impact on the elevation pattern.

In a preferred embodiment, azimuth patterns for three beams are configured for co-pol and x-pol at a 45 degree slant polarization, with the side lobes reduced to approximately 26 dB, which provides a 14 dB improvement compared to FIG. 6 of U.S. Pat. No. 8,311,582 to Trigui et. al. The 10 dB beam width level ranges from 42 to 45 degrees over the 3.7 to 4.0 GHz band, consistent with around an 8 dB cross over level between the output beams spaced 40 degrees apart.

Figure 13A:
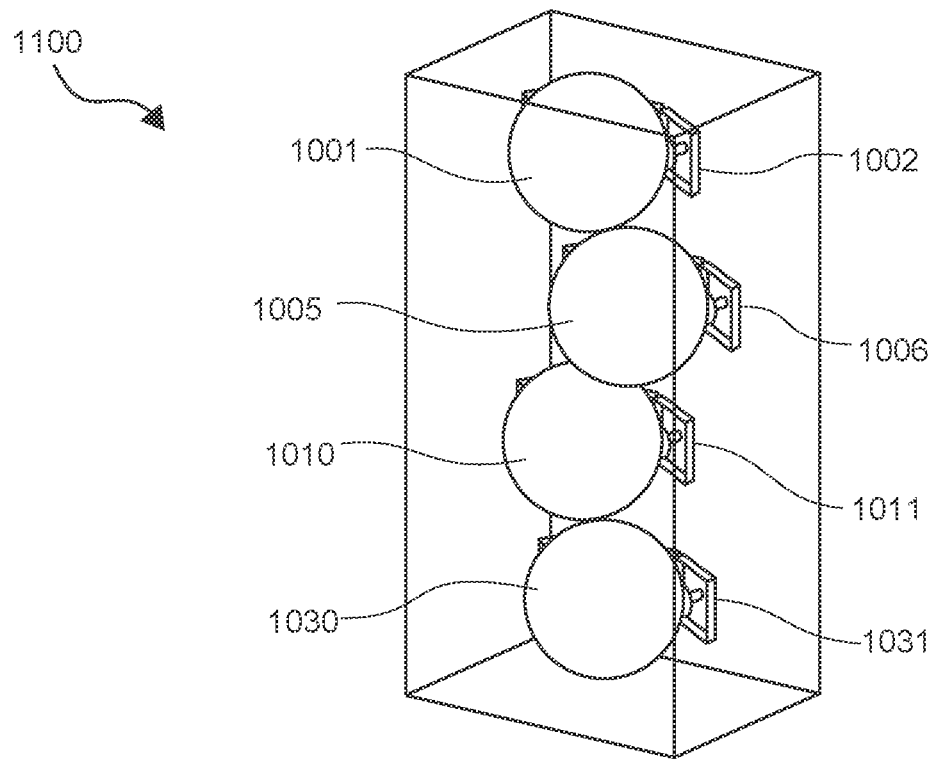
FIGS. 13A and B illustrate the alternative antenna system of FIG. 10 with a first, a second, a third, and a fourth lens in a staggered arrangement.
Figure 13B:
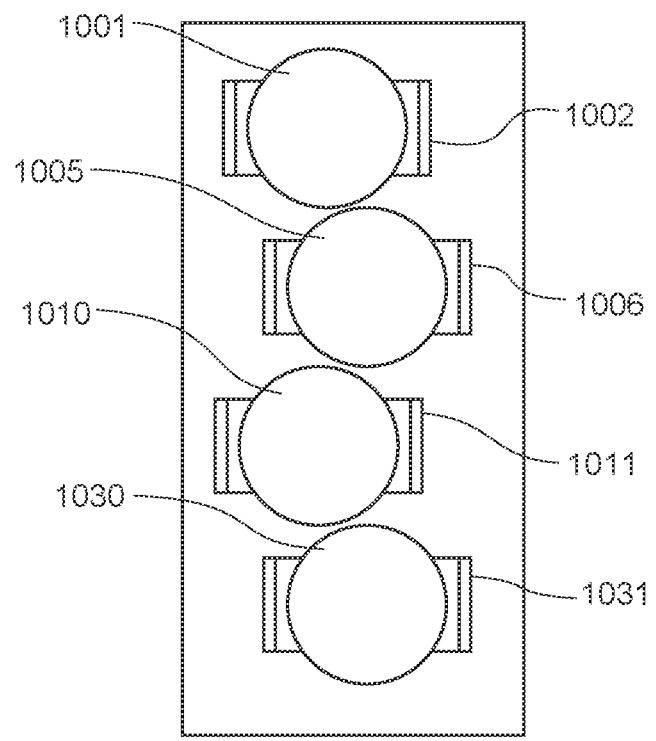

FIGS. 13A and 13B illustrate another embodiment of the array 1000, and include an additional spherical lens 1030, which along with lenses 1001, 1005 and 1010, are each aligned along a different virtual axis in a three-dimensional space. As each of the lenses includes at least one RF element, lens 1030 has RF element 1031. Advantageously, this configuration of array 100 has a mechanically balanced structure which includes the added benefits of less complicated construction, and a doubling of the azimuth side lobe level reduction provided by a first lens to a second lens located above or below the first lens.

Figure 14:
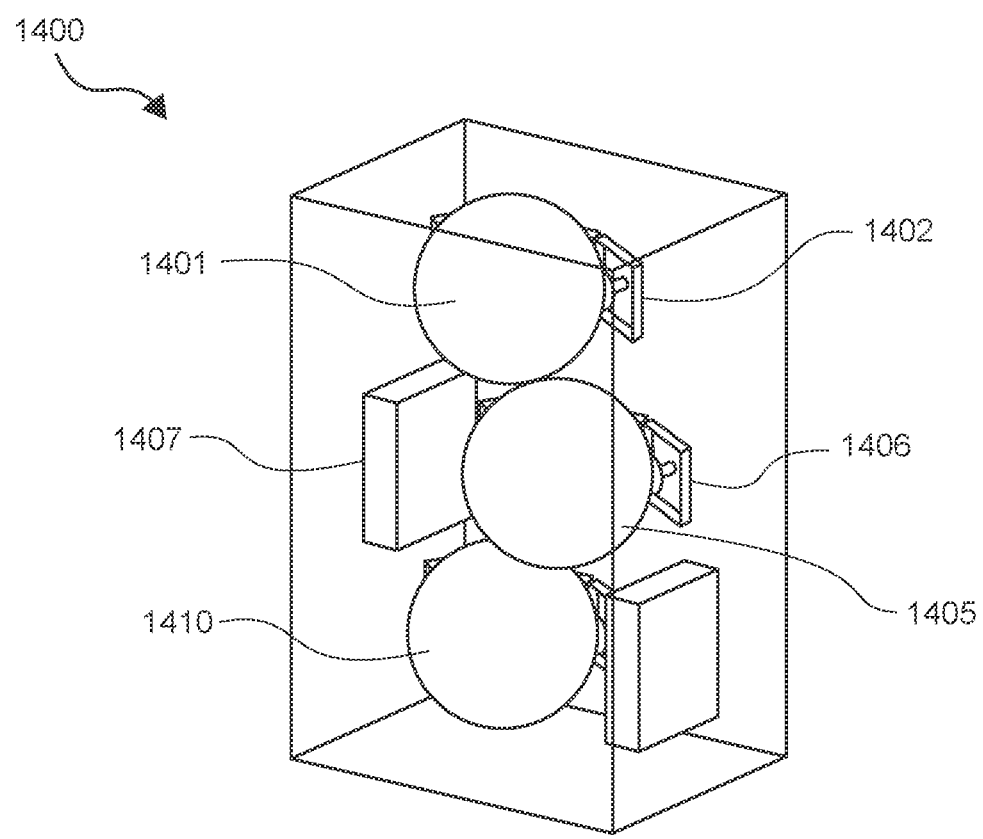
FIG. 14 illustrates an antenna array in a staggered arrangement, with dielectric blocks.

FIG. 14 illustrates a three beam, three lens staggered array 1400 with material blocks. Advantageously, outer beam side lobes (SLL) that occur at roughly +/−90 degrees from the peak of an output beam produced by RF element 1406 are reduced by the coupling of certain lenses to material blocks in array 1400. In a preferred embodiment, material block 1407 is positioned such that a side lobe of an output beam produced by RF element 1406 can travel along an edge of material block 1407. Advantageously, this has the effect of reducing the azimuth SLL in the direction of the output beam produced by RF element 1406, and a reducing the impact on the pattern performance of array 1400. In some embodiments, material block 1407 comprises a dielectric material with permittivity 2.5, a thickness of 30 mm, a height of 150 mm, and a depth of 110 mm. In a preferred embodiment, the phase delay generated by material block 1407 to reduce the azimuth SLL of the output beam produced by RF element 1406 is a function of the dielectric permittivity and thickness of material block 1407. In some embodiments, material block 1407 is positioned with lens 1405 and lens 1410. In related embodiments, material block 1407 is positioned 30 mm from the surface of lens 1405. Material blocks 1407 and 1411 can comprise a dielectric of isotropic or anisotropic material. Antenna array 1400 is similar to antenna system 1000, and includes material blocks 1407 and 1411, which are aligned with lenses 1405 and 1410, respectively. The array 1400 has multiple lenses (including spherical lenses 1401, 1405, and 1410). Each of the lenses includes at least one RF element. Lens 1401 has RF element 1402. Lens 1405 has RF element 1406. Lens 1410 has RF element 1412, which is not shown for simplicity.

Figure 15:
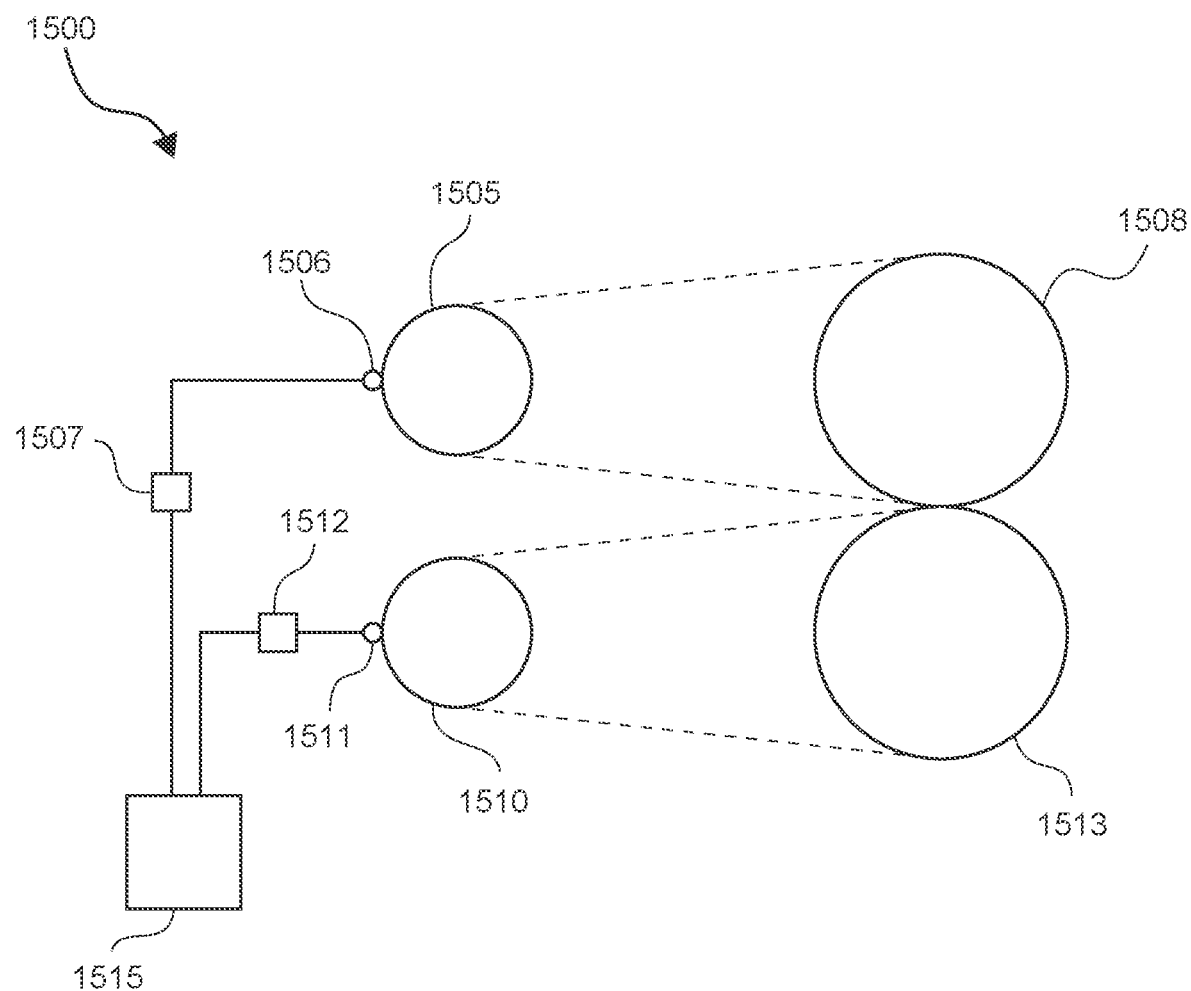
FIG. 15 illustrates an alternative antenna array with a first and a second lens, each producing output beams via their RF element.

FIG. 15 illustrates an antenna similar to FIG. 7A and output areas associated with the antenna array 700, except each lens has a single radiating element. The antenna array 1500 has multiple lenses (including spherical lenses 1505 and 1510). Although array 1500 in this example is shown to include only two spherical lenses in the array of lenses, it is contemplated that array 1500 can include three or more lenses.

Each of the lenses include at least one RF element, and at least one sub-controller. In this example, lens 1505 has RF element 1506, and lens 1510 has RF element 1511. Each RF element has a sub-controller configured for the phase of output beam produced by the RF element. As shown, RF element 1506 is coupled to sub-controller 1507, and RF element 1511 is coupled to sub-controller 1512.

Each RF element generates an output beam. In this example, the RF element 1506 produces an output area 1508, and the RF element 1511 produces an output area 1513. In a preferred embodiment, controller 1515 can command the sub-controllers 1507 and 1512 to adjust the phase of the output beams produced by RF elements 1506 and 1511, respectively, to create an overlapped beam. In a related embodiment, controller 1515 can command the RF elements 1506 and 1511 to produce or cease production of their respective output beams based on the movement of a target.

Figure 16:
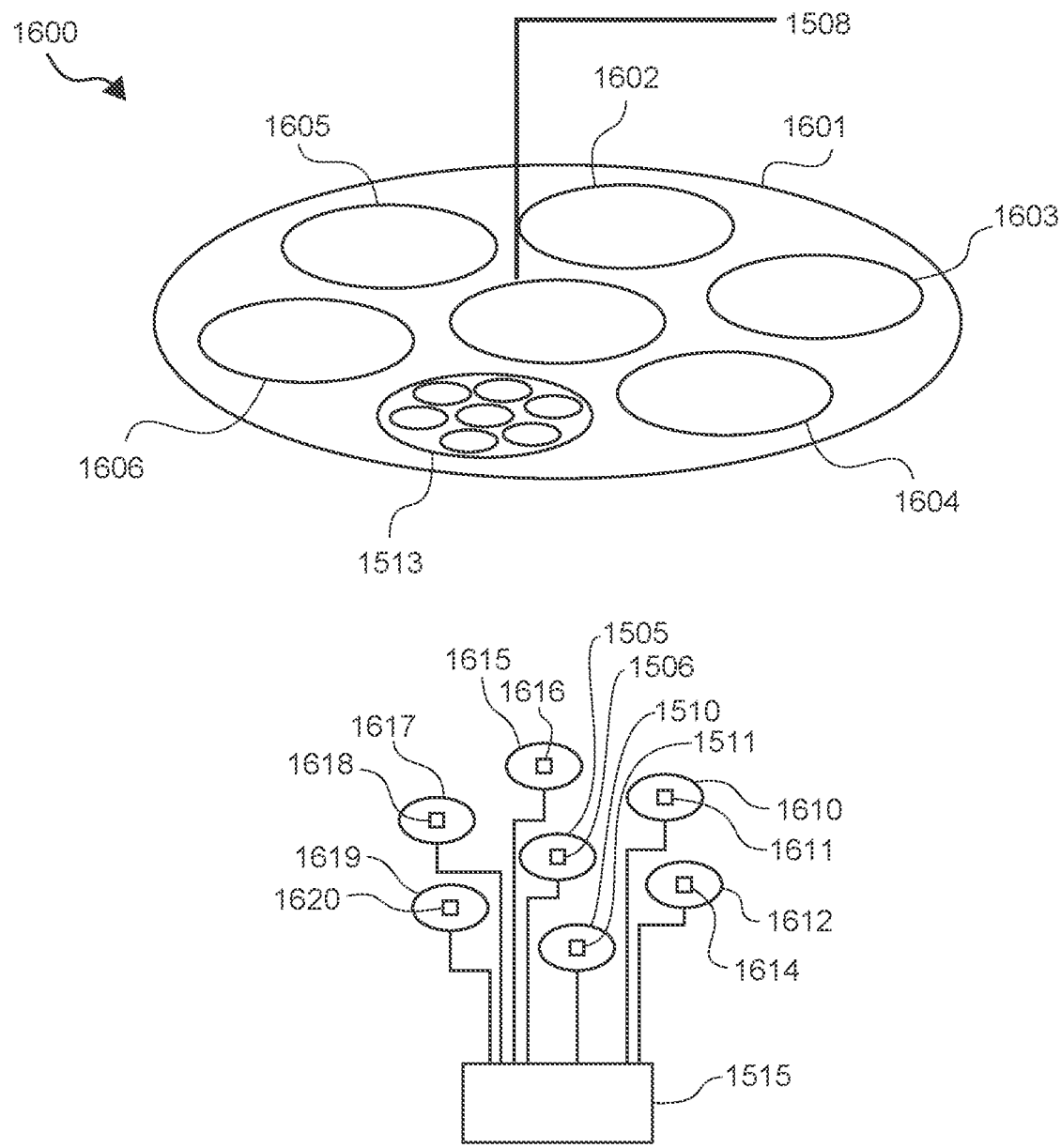
FIG. 16 illustrates an antenna arrangement with seven lenses, each producing output beams via their RF elements, in a beam switching configuration.

FIG. 16 illustrates another embodiment of the antenna arrangement of FIG. 15. Antenna arrangement 1600 is similar to antenna array 900, except the antenna arrangement 1600 is configured for tracking of dynamic targets via beam switching, rather than beam combination. The array 1600 has multiple lenses (including spherical lenses 1505, 1510, 1610, 1612, 1615, 1617, and 1619). Although antenna arrangement 1600 in this example is shown to include only seven spherical lenses, it is contemplated that antenna arrangement 1600 can include eight or more lenses. In a preferred embodiment, at least a first lens is positioned to provide coverage for an area of sky different from the area of sky serviced by a second, different lens. In exemplary embodiments, the lenses of antenna arrangement 1600 are spherical. In alternative embodiments, at least one of the lenses of antenna arrangement 1600 is non-spherical.

Each of the lenses includes at least one RF element, and one sub-controller. Lens 1505 has RF element 1506, lens 1510 has RF element 1511, lens 1610 has RF element 1611, lens 1612 has RF element 1614, lens 1615 has RF element 1616, lens 1617 has RF element 1618, and lens 1619 has RF element 1620. Each lens has a sub-controller configured for combining a first output beam produced by first RF element with a second output beam produced by a second RF element to produce a first overlapped beam as a function of the phases of each output beam.

An output area can have a fixed position, where the output area is directed toward a single area of sky to provide coverage to any targets that may enter the output area. In a preferred embodiment, the output beam from RF element 1506 is activated to create output area 1601. As lens 1505 is spherical, the footprint of output area 1601 is depicted as a circle. In an exemplary embodiment, RF elements 1506, 1511, 1611, 1614, 1616, 1618, and 1620 produce output area 1601. By combining using different relative phase, that is achieved by combining fixed lengths of transmission line, output areas 1508, 1606, 1513, 1604, 1603, 1602, 1605 are produced. Advantageously, a configuration of multiple output areas facilitates the smooth transition for tracking a satellite from one output area to another. For illustration purposes only the output areas can be thought of as representing the 10 dB three-dimensional pattern power contour plot.

In an exemplary embodiment, lens 1506 is a a 500 mm diameter spherical lens, operating at 8 GHz, where the 10 dB beam width contour from lens 1506 will have approximately a 2.5 degree beam width. In a related embodiment, the output areas 1508, 1513, 1602, 1603, 1604, 1605, and 1606, all are configured for 10 dB output beam contours with approximately ⅓ the beam width of the output beam for output area 1601 (e.g. 0.8 degrees). In a preferred embodiment, the position of each output area is determined by the relative phase between the seven lenses in the array 1600. In certain embodiments, the relative phase between RF elements is typically provided by the sub-controller via a power divider network. The concept of creating a set of 7 output areas, each having beam widths approximately ⅓ of the beam width of each individual lens can be scaled to create even smaller output areas for more precise tracking. As an example, the output area 1513, which itself is created by a specific set of combining output areas from lenses 1505, 1511, 1611, 1614, 1616, 1618, and 1620, can be created by combining output areas from 6 other clusters of lenses (not shown).

In some embodiments, the array 1600 is configured as a receive only array. In another embodiment, array 1600 is a transmit and receive (TX/RX) system, where sub-controller that diplexes the transmit signal from the controller receives such the receive signal, amplifies the receive signal by an LNA and the transmit signal by a power amplifier, then recombines the signals to produce a single output beam for transmission and reception.

There are a number of lens configurations for combining RF signals from a seven lens cluster to form the output areas of array 1600. In a preferred embodiment, multiple dual polarized RF elements are tightly packed near the surface of a lens, where the lens is typically spherical in shape. Advantageously, this approach provides the ability to cover a large portion of the sky with a single set of lenses, each lens surrounded by numerous RF elements.

Figure 17:
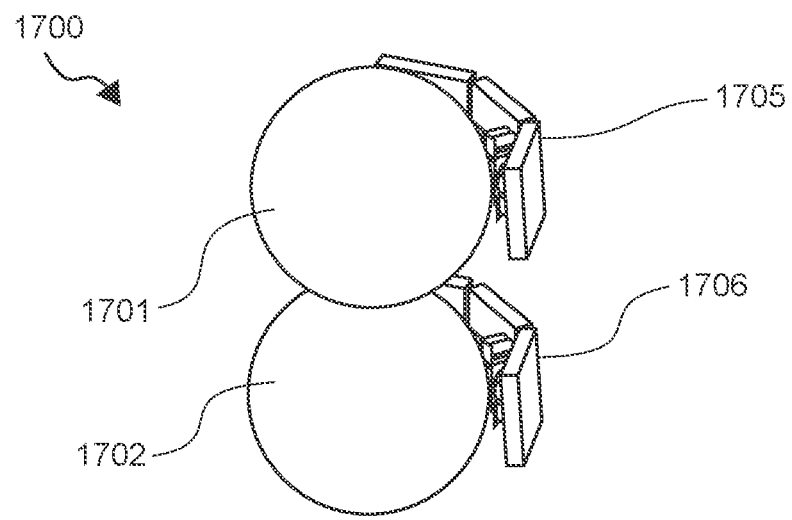
FIG. 17 illustrates an antenna arrangement with three sets of RF elements around each of two lenses.

FIG. 17 illustrates an antenna similar to FIG. 10, intended to produce beams in a horizontal direction, except the lenses are colinear and each RF element has a 4.5-degree tilt. The antenna array 1700 has multiple lenses (including spherical lenses 1701 and 1702). Each of the lenses include at least one RF element. In this example, the lens 1701 has a group of three RF elements 1705, and lens 1702 has a group of three RF elements 1706. In a preferred embodiment, the RF elements of lenses 1701 and 1702 are spaced forty degrees apart to provide coverage over three 40-degree sectors for complete coverage over a traditional 120 degree sector. Each RF element within the array 1700 has a slight 4.5-degree tilt, such that each output beam generated by the array 1700 is tilted in the vertical plane of 4.5 degrees. Although array 1700 in this example is shown to include only two spherical lenses in the array of lenses, it is contemplated that array 1700 can include three or more lenses. FIG. 17 is an example of the concept of "pre-tilt" discussed above as a further means to reduce the upper grating lobes.

It should be evident that there are three interchangeable techniques; 1) moving the feed with tilt, 2) providing a pre-tilt, 3) keeping the feed fixed and allowing just the phase shifter to provide the beam tilt. Any combination of these three techniques can be used not just for a given array, but different combinations of techniques can be used within array 1700. In an embodiment, the array 1700 is configured to allow the middle element of an array to move but keep the upper and lower elements fixed with beam tilt. In a related embodiment, the array 1700 is configured to vary the pre-tilt from element to element, the top element having a 3-degree pre-tilt and each successive element having 0.5 degree less pre-tilt. The present invention is based on the recent advances in meta materials (U.S. Pat. No. 8,518,537) and is a further extension of the initial patent issued for arraying together lens antennas using plane waves (U.S. Pat. No. 9,728,860).

In a preferred embodiment, a phase shifter is configured to apply a relative phase between two in-line RF elements in the vertical plane to produce a resulting arrayed beam (or overlap beam). The phase shifter provides equal phase, representing zero degree down tilt.

In a related embodiment, the peak of the main beam is at zero degrees, and main beam position is determined firstly by the relative phase between two RF elements. Advantageously, the first upper side lobe is −15 dB down from main beam peak. Without the "pre-tilt" technique the first upper side lobe would be around 11-12 dB. The third feature to notice is the first lower side lobe is typically around −7.5 dB. This is again due to the "pre-tilt" but as mentioned above. In some embodiments, RF elements lack "pre-tilt", but point along the horizon. In a preferred embodiment, the beam pattern generated by an RF element is configured for 4.5 degrees of pre-tilt. As a result of the beam peak being down tilted, the power level at zero degrees is around −0.25 dB, and represents the boresight gain loss impact due to this technique. If less than 4.5 degree of "pre-tilt" is used this gain loss will be reduced. Further, typically, the power level at 20 degrees above the horizon is −9.6 degrees, or 3.6 degrees lower than without pre-tilt.

It should be noted that when the feeds are rotated for different down tilts the pre-tilt is maintained. In a preferred embodiment, a 15 degree tilt with 4.5 degree pre-tilt results in each RF element tilting 19.5 degrees relative to the horizon. Advantageously, this pre-tilting technique is not frequency sensitive, and can be used with equal effectiveness over any frequency band. In a related embodiment, the RF elements are configured in a fixed position, with the beam tilt being adjusted only with changing the relative phase between RF elements by use of a phase shifter.

Figure 18:
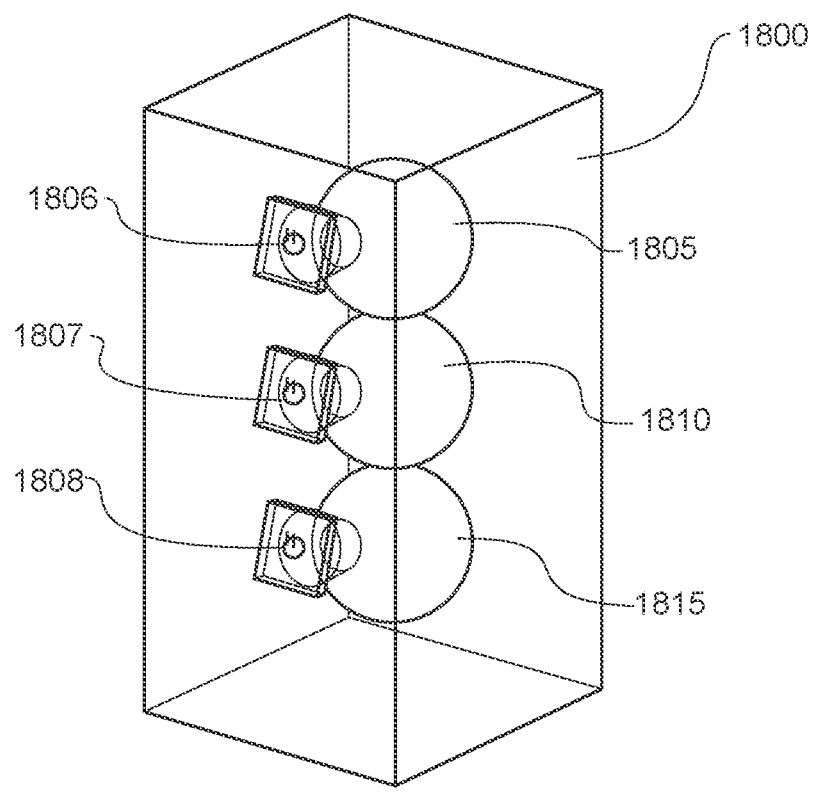
FIG. 18 illustrates an antenna arrangement with three RF lenses where the feeds illuminating the lenses are positioned to provide a fixed "pre-tilt".

FIG. 18 illustrates a three-lens antenna similar to FIG. 17, except each RF element has a 8-degree tilt. The antenna array 1800 has multiple lenses (including spherical lenses 1805, 1810, and 1815). Each of the lenses include at least one RF element. In this example, lens 1805 has RF element 1806, lens 1810 has RF element 1807, and lens 1815 has RF element 1808.

In preferred embodiments, the electrical down tilt matches the physical tilting of the RF elements of array 1800. Here, the first upper side lobes typical range is between a 19 dB to −14 dB. In a related embodiment, the elements remain fixed at 8 degrees, but the relative phase between RF elements is set for a 4 degree down tilt, showing the limit of keeping the RF elements in a fixed position.

Figure 19:
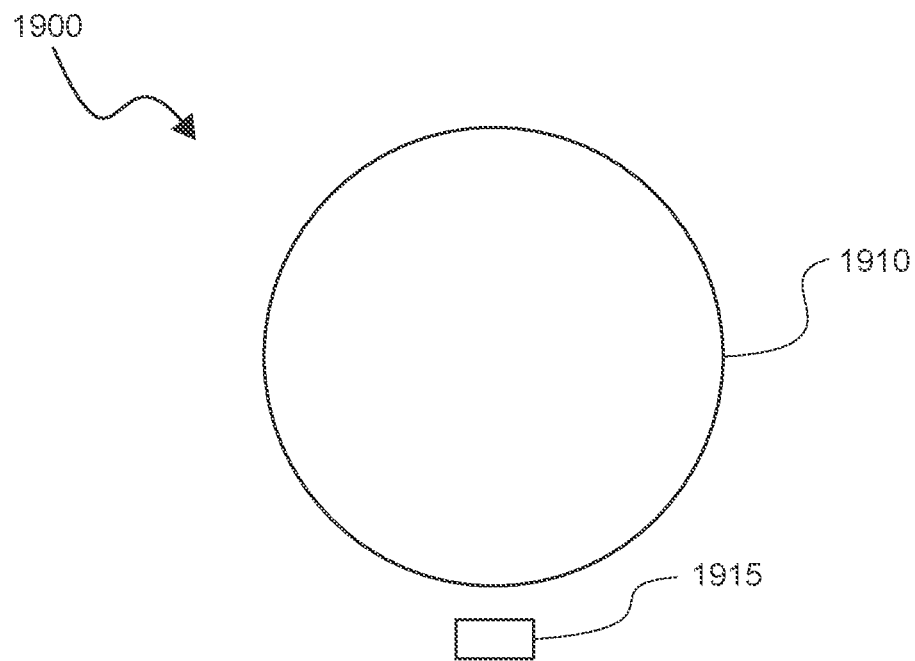
FIG. 19 illustrates an antenna system, with a single RF element.

FIG. 19 illustrates an antenna system 1900 which includes spherical RF lens 1910 and RF element 1915. In certain embodiments, the RF element 1915 is configured as a single dual polarized dipole. In a preferred embodiment, the phase center of RF element 1915, which occurs approximately at the location of the dipole ground plane, is placed at the focal point of the RF lens 1910. In a related embodiment, the typical azimuth pattern for the RF element 1915 described in FIG. 19 has a worst side lobe of −19.3 dB.

Figure 20:
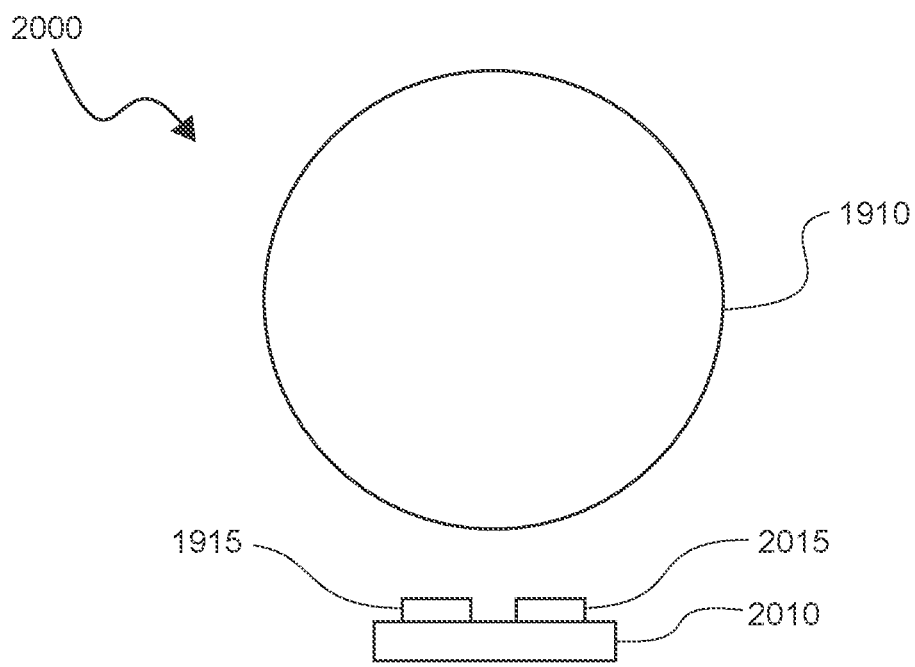
FIG. 20 illustrates the front-facing perspective of an alternative antenna system with a dual RF element.

FIG. 20 illustrates an antenna system 2000 according to some embodiments of the inventive subject matter. In this example, the antenna system 2000 includes RF lens 1910 and Dual RF element 2010. In a preferred embodiment, Dual RF element 2010 comprises RF element 1915 and RF element 2015. Antenna arrangement 2000 is like antenna array 1900, except for the two RF elements placed in close proximity to each other. This creates an illumination on the lens closer to the desired Gaussian illumination. In a preferred embodiment, RF element 1915 and RF element 2015 should be distanced from each other by a half wavelength, as measured from phase center to phase center.

In a preferred embodiment, the revised azimuth pattern for the Dual RF element 2010 described in FIG. 20, has a worst side lobe is −25.7 dB—an improvement of 6.4 dB from a previous embodiment. This level of improvement is significant as it directly correlates to signal to interference plus noise plus ratio (SINR). To achieve higher data rates used in 5G wireless networks such as 64 QAM and 256 QAM higher SINR is needed. In a preferred embodiment, by lowering side lobes via Dual RF element 2010, interference from adjacent sectors is reduced, improving SNIR.

In a preferred embodiment, azimuth patterns for three beams are configured for co-pol and x-pol at a 45 degree slant polarization, with the side lobes reduced to approximately 26 dB, which provides a 14 dB improvement compared to FIG. 6 of U.S. Pat. No. 8,311,582 to Trigui et. al. The 10 dB beam width level ranges from 42 to 45 degrees over the 3.7 to 4.0 GHz band, consistent with around an 8 dB crossover level between the output beams spaced 40 degrees apart.

Figure 21:
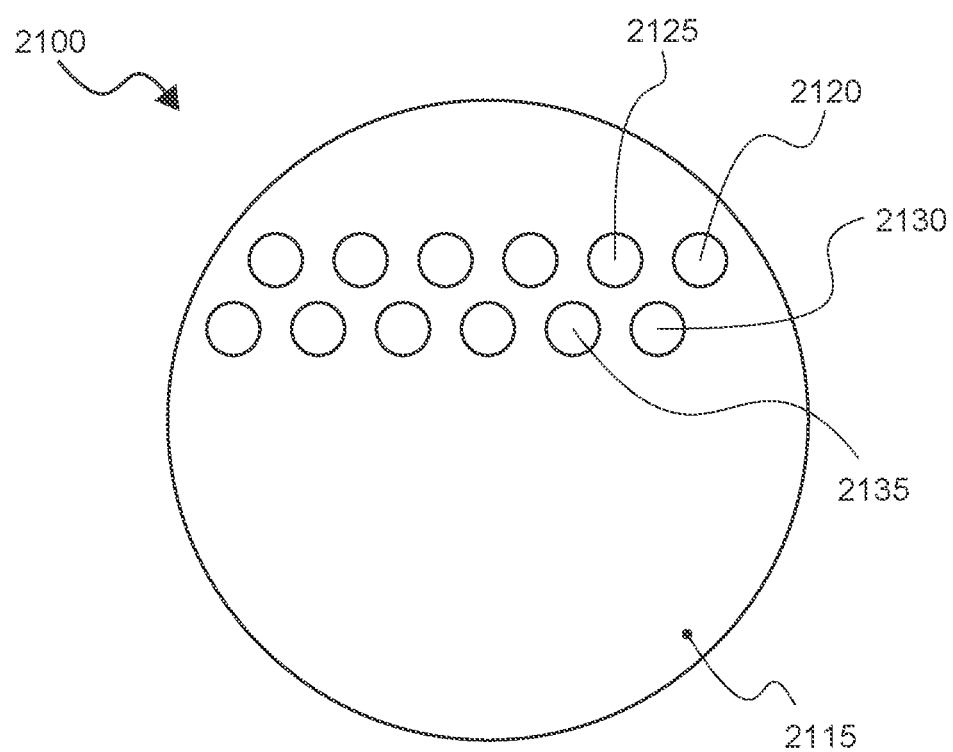
FIG. 21 illustrates an antenna system according to another embodiment of the inventive subject matter demonstrating the tight packing of beams into multiple rows.

FIG. 21 illustrates an antenna system 2100 according to another embodiment of the inventive subject matter. In this example, the antenna system 2100 includes RF lens 2115, an RF element 2120, RF element 2125, RF element 2130, and RF element 2135. In a preferred embodiment, antenna system 2100 includes several rows of RF elements. Each RF element generates an output beam, which is adjusted by its associated sub-controller. The RF elements in FIG. 21 are depicted in the u-v coordinate system that maps a 3-dimensional spherical coordinate system onto a 2 dimension "x-y" style coordinates for ease of viewing. The circles shown can be considered equal power contour plots, for example 3 dB or 10 dB contours. In certain embodiments, the RF elements are disposed in rows with a stagger between each row. This method of placing the RF elements results in increased beam cross-over levels over a given three-dimensional coverage area, or output area. In a preferred embodiment, the output beams of FIG. 21A are configured to cover a 120 degree desired coverage area. In related embodiments, each output beam covers 10 degrees within the desired coverage area, where the antenna operates at around 4 GHz. In some embodiments, it is not practical to place 12 RF elements in a common line, for example along the equator on the sphere, as each RF element requires approximately a half wavelength ground plane, which at 4 GHz is 37.5 mm, or for 12 RF elements represents an arc of approximately 450 mm. In related embodiments, the RF elements of RF lens 2115 are configured for a tilt between 3 and −15 degrees. In a preferred embodiment, RF lens 2110 is a 450 mm diameter lens configured for beam widths of 10 degree beam spacing. In a related embodiment, on the surface of RF lens 2110, an arc of 120 degrees at the equator subtends approximately 470 mm. Advantageously, this arrangement would result in 12 RF elements with enough separation to independently move to provide independent beam tilts.

In a preferred embodiment, exemplary azimuth patterns for the output beams of antenna system 2100, are provided where each RF element is afforded approximately 80 mm of horizontal spacing, to allow movement over a wide range of independent tilts. In related embodiments, each RF element is afforded approximately 100 mm of horizontal spacing. The top row of output beams have azimuth beam peaks at −55, −35, −15, +5, +25, and +45 degrees. The bottom row of output beams have azimuth beam peaks at −45, −25, −5, +15, +35, and +55 degrees. Using this arrangement beam cross over levels above 10 dB are maintained over the 120 degrees azimuth sector as well as over +/−20 degrees of vertical coverage.

Figure 22:
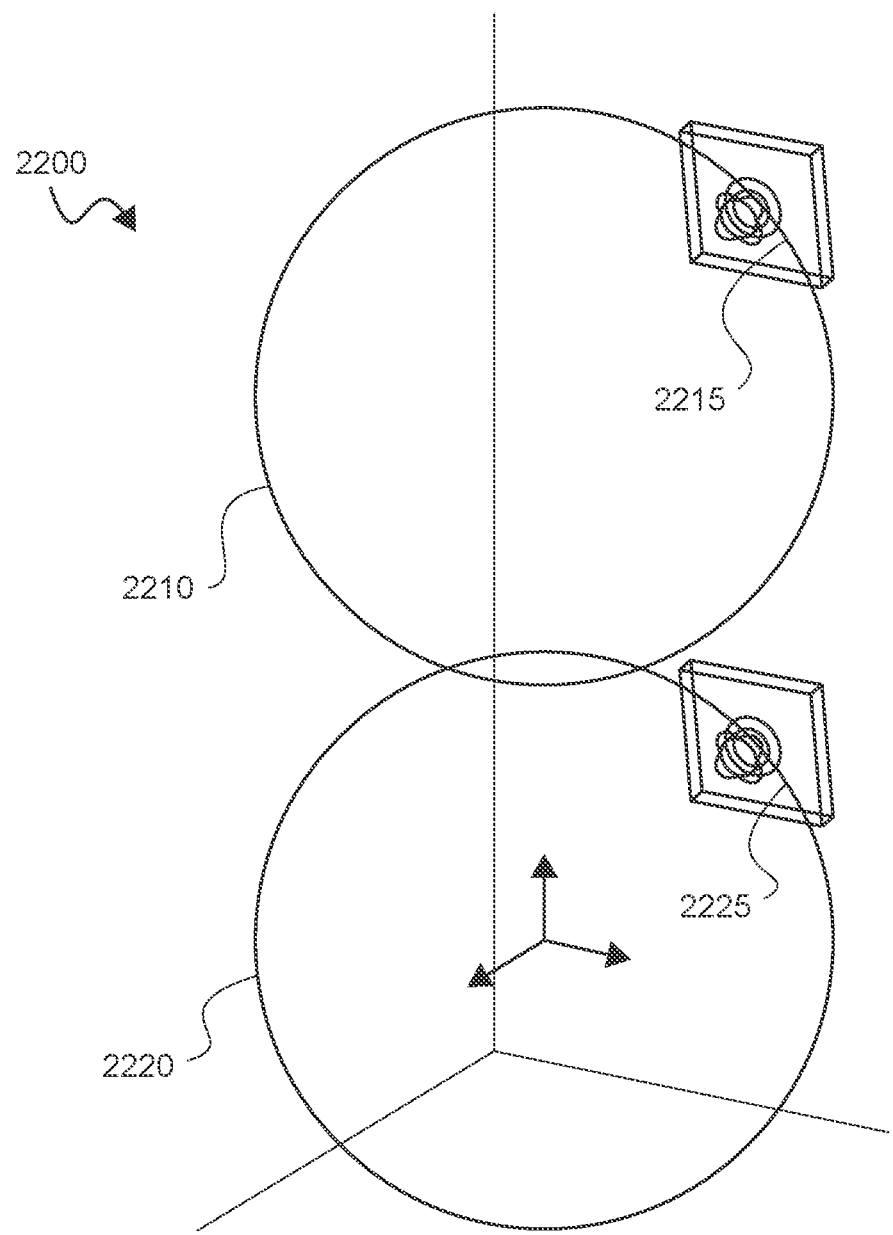
FIG. 22 illustrates the front-facing perspective of an alternative antenna system with two RF elements.
Figure 23A:
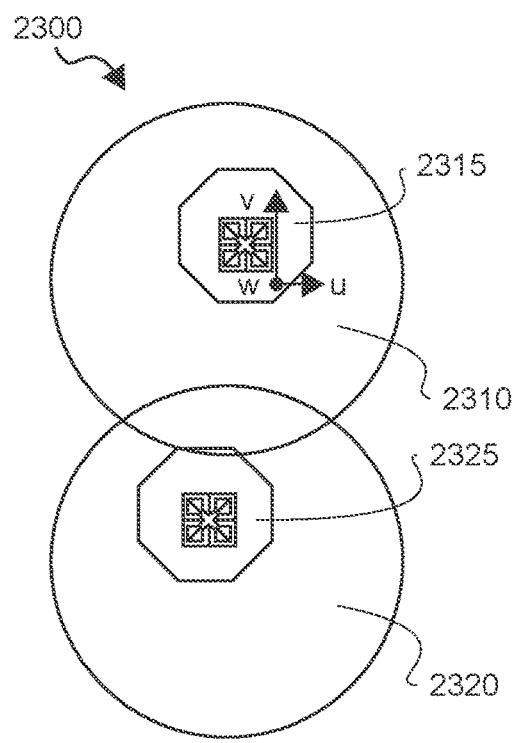
FIG. 23A illustrates a front facing view of an alternative antenna array with a first and a second lens, each producing output beams via their RF elements.
Figure 23B:
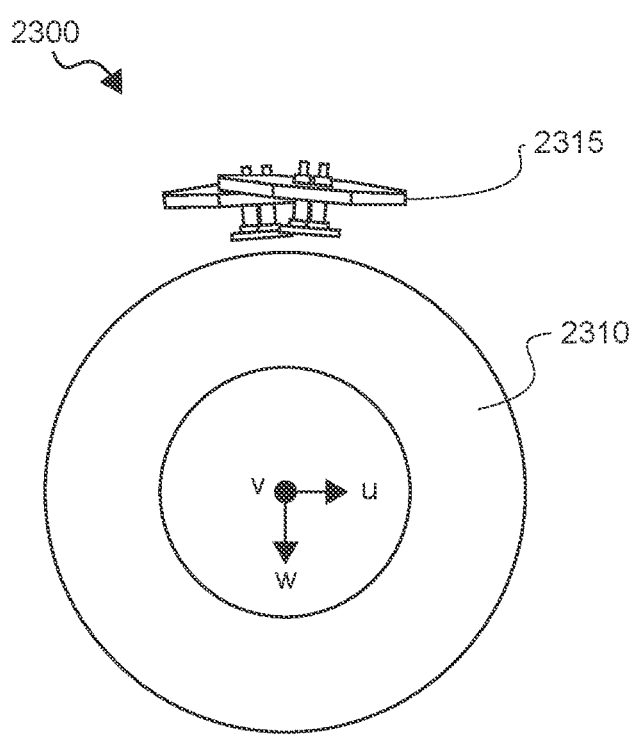
FIG. 23B illustrates a top down view of an alternative antenna array with a first and a second lens, each producing output beams via their RF elements.

FIG. 22 illustrates an antenna system 2200 according to another embodiment of the inventive subject matter. In this example, the antenna system 2200 includes RF lens 2210 and RF lens 2220, having RF element 2215 and RF element 2225, respectively. In a preferred embodiment, antenna system 2200 includes a row of RF elements. Each RF element generates an output beam, which is adjusted by its associated sub-controller. In the depicted example, antenna system 2200 is a two-element array where RF elements 2215 and 2225 are co-linear. FIG. 23A depicts a similar two element array 2300, with RF elements 2315 and 2325 each rotated slightly in alternate directions. FIG. 23A depicts a front view, and FIG. 23B depicts a top view of the illustrative arrangement. This modification results in two desired changes to the RF performance; 1) the azimuth beam width is more consistent across the band and 2) there is a reduction in azimuth side lobes.

Figure 24A:
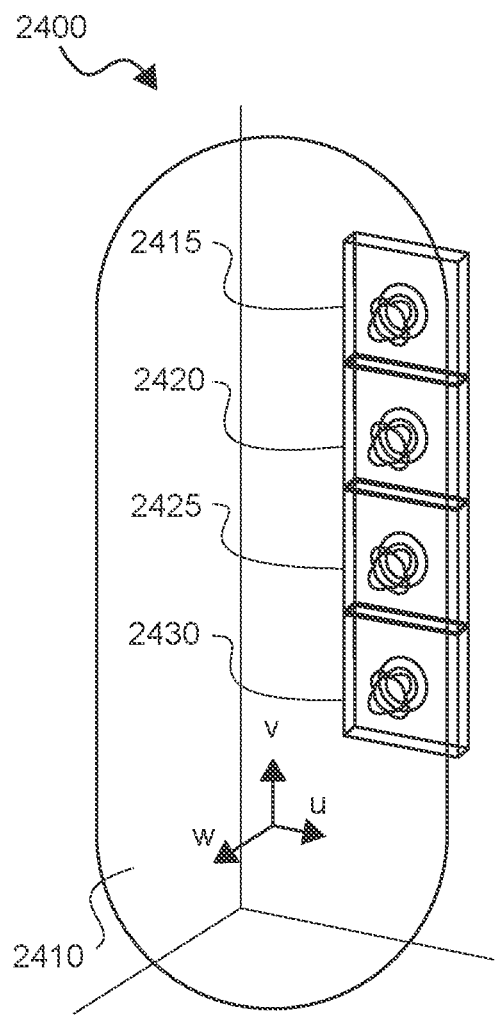
FIG. 24A illustrates the placement of multiple RF elements in a single row on a single cylindrical lens in an antenna array.
Figure 24B:
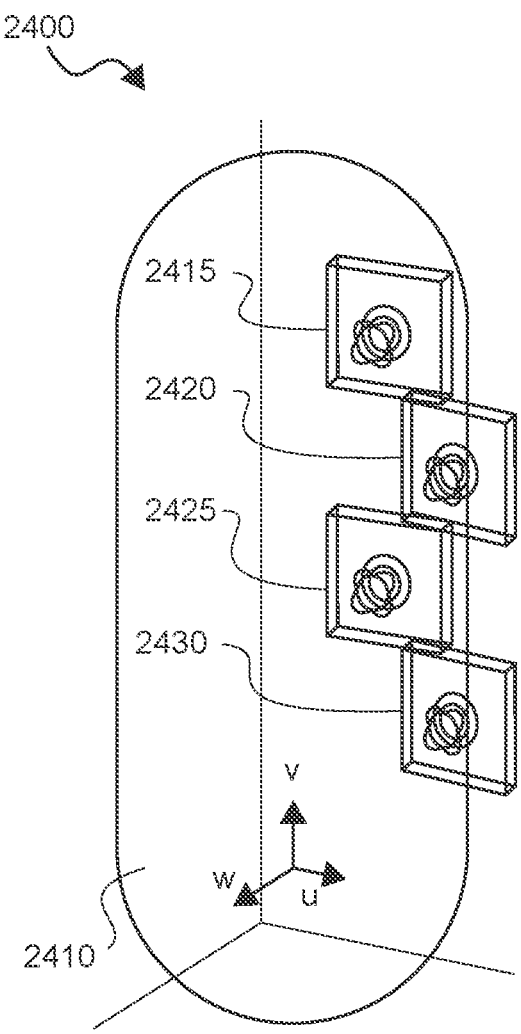
FIG. 24B illustrates an antenna system according to another embodiment of the inventive subject matter demonstrating the placement of multiple RF elements on a single cylindrical lens in a staggered arrangement in an antenna array.

It is contemplated that this invention can be applied to any RF lens array arrangement. FIG. 24A illustrates an antenna system 2400 according to another embodiment of the inventive subject matter with a cylindrical RF lens 2410 having an array of four RF elements 2415, 2410, 2425, and 2430 in a linear array. FIG. 24B depicts an additional embodiment of this inventive concept as applied to the cylindrical RF lens, where the RF elements 2415, 2410, 2425, and 2430 are rotated slightly in an alternating fashion. In a preferred embodiment, the amount of rotation of feed elements will depend on the desired effect and the trade-off with lower gain due to a wider azimuth beam produced by the feed elements.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A communication system, comprising:
   an array of lenses having at least a first lens and a second lens;
   wherein the first lens has a first RF element oriented to produce a first output beam, and a second RF element oriented on at least one of the first lens and the second lens to produce a second output beam;
   wherein the first RF element is configured to rotate about a first virtual axis by a first distance, and the second RF element is configured to rotate about the first virtual axis by a second distance; and
   a third lens having a third RF element oriented to produce a third output beam, and a fourth RF element oriented with respect to at least one of the first, second, and third lenses to produce a fourth output beam.

2. The communication system of claim 1, wherein the first distance and the second distance are equal.

3. The communication system of claim 1, wherein rotation of the first RF element about the first virtual axis is in a direction opposite to rotation of the second RF element about the first virtual axis.

4. The communication system of claim 1, wherein the third RF element is configured to rotate about a third virtual axis by a third distance, and the fourth RF element is configured to rotate by about a fourth virtual axis by a fourth distance.

5. The communication system of claim 4, wherein the third distance and the fourth distance are the same.

6. The communication system of claim 4, wherein the third distance and the fourth distance are different.

7. The communication system of claim 1, wherein at least the first RF element and the third RF element are configured in a staggered arrangement.

8. The communication system of claim 1, wherein at least one of the first RF element, the second RF element, the third RF element, and fourth RF element is configured for dual-polarization.

9. The communication system of claim 1, wherein the first RF element is positioned so that a center of a radiation pattern emitted by the first RF element is directed towards a center point of the first lens.

10. The communication system of claim 1, wherein the first lens comprises a substantially spherical lens.

11. The communication system of claim 1, wherein at least 50% of the surface area for the first lens conforms to a shape of a sphere.

12. The communication system of claim 1, wherein at least one of the first, second, and third lenses is substantially cylindrical.

13. The communication system of claim 1, wherein the first lens comprises a dielectric material.

* * * * *